(12) United States Patent
Takeuchi

(10) Patent No.: US 11,187,305 B2
(45) Date of Patent: Nov. 30, 2021

(54) TRANSMISSION AND VEHICLE

(71) Applicant: YAMAHA HATSUDOKI KABUSHIKI KAISHA, Iwata (JP)

(72) Inventor: Yoshihiko Takeuchi, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 786 days.

(21) Appl. No.: 15/893,622

(22) Filed: Feb. 10, 2018

(65) Prior Publication Data

US 2018/0187756 A1 Jul. 5, 2018

Related U.S. Application Data

(63) Continuation-in-part of application No. PCT/JP2016/073681, filed on Aug. 10, 2016.

(30) Foreign Application Priority Data

Aug. 10, 2015 (JP) .............................. JP2015-158324
Aug. 10, 2015 (JP) .............................. JP2015-158325

(Continued)

(51) Int. Cl.
*F16H 3/089* (2006.01)
*F16H 63/18* (2006.01)
(Continued)

(52) U.S. Cl.
CPC ............. *F16H 3/089* (2013.01); *B62M 11/06* (2013.01); *F16D 11/10* (2013.01); *F16D 11/14* (2013.01);
(Continued)

(58) Field of Classification Search
CPC .......... F16H 3/083; F16H 3/089; F16H 3/091; F16H 63/18; F16H 2061/0474;
(Continued)

(56) References Cited

U.S. PATENT DOCUMENTS

| 4,416,168 A | 11/1983 | Arai et al. |
| 4,658,661 A | 4/1987 | Terashita |

(Continued)

FOREIGN PATENT DOCUMENTS

| CN | 202195025 U | 4/2012 |
| CN | 102691757 A | 9/2012 |

(Continued)

*Primary Examiner* — William C Joyce
(74) *Attorney, Agent, or Firm* — Rabin & Berdo, P.C.

(57) ABSTRACT

A first slider and a fifth-speed driving gear are arranged along an axial direction on a driving shaft. A shift fork has an end located in a guide groove of a shift drum, and another end connected to the first slider. In gear-shifting to a fifth speed, the first slider moves on the driving shaft so that a plurality of fifth-speed dog projections and a plurality of fifth-speed dog recesses mesh with each other. At least four of the plurality of fifth-speed dog projections and at least four of the plurality of fifth-speed dog recesses mesh within a range of 90 degrees at one side in the circumferential direction of the fifth-speed driving gear and a range of 90 degrees at another side in the circumferential direction of the fifth-speed driving gear with respect to a reference line.

13 Claims, 9 Drawing Sheets

(30) Foreign Application Priority Data

Aug. 10, 2015 (JP) .............................. JP2015-158326
Aug. 10, 2015 (JP) .............................. JP2015-158327

(51) Int. Cl.

| | | |
|---|---|---|
| F16D 23/14 | (2006.01) | |
| F16D 21/04 | (2006.01) | |
| F16D 11/10 | (2006.01) | |
| F16H 63/30 | (2006.01) | |
| F16H 3/083 | (2006.01) | |
| F16H 3/091 | (2006.01) | |
| B62M 11/06 | (2006.01) | |
| F16H 37/02 | (2006.01) | |
| F16H 61/32 | (2006.01) | |
| F16D 11/14 | (2006.01) | |
| F16D 23/12 | (2006.01) | |
| F16H 61/04 | (2006.01) | |
| F16H 61/28 | (2006.01) | |
| F16H 63/32 | (2006.01) | |

(52) U.S. Cl.

CPC ............. *F16D 21/04* (2013.01); *F16D 23/12* (2013.01); *F16D 23/14* (2013.01); *F16H 3/083* (2013.01); *F16H 3/091* (2013.01); *F16H 37/02* (2013.01); *F16H 61/32* (2013.01); *F16H 63/18* (2013.01); *F16H 63/30* (2013.01); *F16H 63/304* (2013.01); *B60Y 2200/12* (2013.01); *F16D 2023/123* (2013.01); *F16H 63/32* (2013.01); *F16H 2061/0474* (2013.01); *F16H 2061/2869* (2013.01); *F16H 2063/3056* (2013.01); *F16H 2063/3093* (2013.01); *F16H 2200/0013* (2013.01); *F16H 2200/0052* (2013.01)

(58) Field of Classification Search

CPC . F16H 2063/3056; B62M 11/06; F16D 11/10; F16D 11/14; F16D 21/04
USPC ....................................................... 74/337.5
See application file for complete search history.

(56) References Cited

U.S. PATENT DOCUMENTS

| | | | |
|---|---|---|---|
| 4,949,587 A | 8/1990 | Oka | |
| 5,368,145 A * | 11/1994 | Davis | F16D 11/10 192/69.81 |
| 6,095,004 A * | 8/2000 | Ota | F16H 61/32 74/336 R |
| 6,095,303 A * | 8/2000 | Gutmann | F16D 11/10 192/48.91 |
| 6,354,417 B1 * | 3/2002 | Narita | F16D 11/10 192/108 |
| 6,725,962 B1 | 4/2004 | Fukuda | |
| 7,445,575 B2 * | 11/2008 | Capita | F16D 11/04 475/204 |
| 7,631,570 B2 * | 12/2009 | Mizuno | F16H 61/32 74/331 |
| 7,752,936 B2 * | 7/2010 | Kobayashi | F16H 63/18 74/337.5 |
| 8,328,686 B2 * | 12/2012 | Kobayashi | F16H 61/061 477/79 |
| 9,541,193 B2 | 1/2017 | Arai et al. | |
| 10,393,264 B2 | 8/2019 | Takahashi | |
| 2005/0039558 A1 | 2/2005 | Shen | |
| 2006/0053966 A1 | 3/2006 | Hori | |
| 2006/0090584 A1 | 5/2006 | Ho | |
| 2007/0240955 A1 | 10/2007 | Zenno | |
| 2007/0243973 A1 | 10/2007 | Minami | |
| 2008/0098837 A1 | 5/2008 | Hiroi et al. | |
| 2008/0178695 A1 | 7/2008 | Fujimoto et al. | |
| 2008/0214348 A1 * | 9/2008 | Hasegawa | F16H 37/043 475/80 |
| 2009/0178874 A1 | 7/2009 | Mizutani et al. | |
| 2009/0205455 A1 | 8/2009 | Kosugi | |
| 2009/0270224 A1 | 10/2009 | Minami | |
| 2010/0064848 A1 | 3/2010 | Komori | |
| 2011/0232400 A1 | 9/2011 | Tanaka et al. | |
| 2012/0240698 A1 | 9/2012 | Ogawa et al. | |
| 2012/0247241 A1 | 10/2012 | Takahashi et al. | |
| 2014/0291102 A1 | 10/2014 | Iwasaki et al. | |
| 2015/0176683 A1 | 6/2015 | Takahashi | |
| 2015/0176706 A1 | 6/2015 | Saitoh | |

FOREIGN PATENT DOCUMENTS

| | | |
|---|---|---|
| EP | 1580454 A1 | 9/2005 |
| EP | 2042784 A1 | 4/2009 |
| EP | 2515009 A2 | 10/2012 |
| EP | 2708773 A1 | 3/2014 |
| FR | 2887604 A1 | 12/2006 |
| JP | S48-65961 U | 8/1973 |
| JP | S4844373 Y1 | 12/1973 |
| JP | S4938835 Y1 | 10/1974 |
| JP | S5628346 A | 3/1981 |
| JP | S63-187726 U | 12/1988 |
| JP | H03-148391 A | 6/1991 |
| JP | H06-123355 A | 5/1994 |
| JP | H07-054995 A | 2/1995 |
| JP | 2000027991 A | 1/2000 |
| JP | 2005-042910 A | 2/2005 |
| JP | 2007-162819 A | 6/2007 |
| JP | 2008-38922 A | 2/2008 |
| JP | 2008-106918 A | 5/2008 |
| JP | 2009-024790 A | 2/2009 |
| JP | 2009-197823 A | 9/2009 |
| JP | 2010096190 A | 4/2010 |
| JP | 2011080538 A | 4/2011 |
| JP | 2011-196520 A | 10/2011 |
| JP | 2013217491 A | 10/2013 |
| JP | 2014-035063 A | 2/2014 |
| JP | 2014-59002 A | 4/2014 |
| JP | 2014-206233 A | 10/2014 |
| JP | 2015-117798 A | 6/2015 |
| JP | 2015-121244 A | 7/2015 |
| KR | 2013-0061788 A | 6/2013 |

* cited by examiner

TRANSMISSION AND VEHICLE

CROSS-REFERENCES TO RELATED APPLICATIONS

The present application is a continuation-in-part application of International Application No. PCT/JP2016/073681, filed on Aug. 10, 2016, and having the benefit of the earlier filing dates of Japanese Application No. 2015-158324, filed Aug. 10, 2015, Japanese Application No. 2015-158325, filed Aug. 10, 2015, Japanese Application No. 2015-158326, filed Aug. 10, 2015, and Japanese Application No. 2015-158327, filed Aug. 10, 2015. The content of the each of the identified applications is incorporated herein by reference in its entirety.

BACKGROUND

Technical Field

The present invention relates to a transmission to be mounted on a vehicle, and a vehicle including the transmission.

A transmission to be mounted on a vehicle includes a driving shaft extending in an axial direction and connected to a power source (e.g., an engine and a motor) through a clutch mechanism and a driven shaft extending in the axial direction. Each of the driving shaft and the driven shaft is provided with gears in a number corresponding to the number of gear stages. In a transmission having such a configuration, in each gear stage, a driving gear provided on the driving shaft and a driven gear provided on the driven shaft mesh each other to thereby constitute a gear pair. The transmission ratio differs among gear pairs. In the transmission, only the gear pair corresponding to a selected gear stage transfers power.

A transmission disclosed in Patent Document 1 (identified further on), for example, includes a shift drum and a shift fork. The shift drum rotates with back and forth movement of a shift rod. The outer peripheral surface of the shift drum has a plurality of cam grooves. One end of the shift fork is located in a corresponding one of the cam grooves of the shift drum. The other end of the shift fork is connected to, for example, a predetermined transmission gear disposed on a main shaft.

The predetermined transmission gear is disposed on the main shaft to be movable in the axial direction of the main shaft. The shift drum has its rotation angle vary depending on a selected gear stage. The cam grooves are formed on the outer peripheral surface of the shift drum in such a manner that the location in the axial direction of the main shaft varies in accordance with the rotation angle. In this manner, depending on the selected gear stage, the shift fork whose one end is located in the cam groove moves in the axial direction of the main shaft. Accordingly, the predetermined transmission gear connected to another end of the shift fork moves in the axial direction of the main shaft.

The predetermined transmission gear is disposed on the main shaft in a relatively non-rotatable manner. The predetermined driven gear meshing with the predetermined transmission gear is provided on the drive shaft in a relatively rotatable manner. A driving gear adjacent to the predetermined transmission gear along the axial direction of the main shaft is provided on the main shaft in a relatively rotatable manner. A driven gear meshing with the driving gear is provided on the drive shaft in a relatively non-rotatable manner.

The predetermined transmission gear has dog projections. The dog projections extend toward the driving gear. The driving gear has dog recesses. When rotation of the shift drum causes the shift fork to move in axial direction of the main shaft, the predetermined transmission gear moves in the axial direction toward the driving gear. In this manner, the dog projections of the predetermined transmission gear are engaged with the dog recesses of the driving gear. Accordingly, the driving gear rotates in synchronization with the predetermined transmission gear. Thus, power is transferred from the main shaft to the drive shaft through the gear pair of the driving gear and the driven gear. That is, when the predetermined transmission gear moves in the axial direction of the main shaft, a gear-shift operation of the transmission is performed.

CITATION LIST

Patent Document

Patent Document 1: Japanese Patent Application Publication No. 2014-035063

In the transmission configured as described above, occurrence of noise called "dog clunking noise" is unavoidable in a gear-shift operation. While the driving shaft (main shaft) is rotating, one driving gear (predetermined transmission gear) that has dog projections and rotates integrally with the driving shaft and another driving gear that has dog recesses and rotates relative to the driving shaft rotate relative to each other. Dog clunking noise is noise occurring when rotation of the one driving gear synchronizes with rotation of the other driving gear.

Specifically, dog clunking noise occurs when the one driving gear approaches another driving gear and the front ends of the dog projections collide with a side surface (a portion where no dog recesses are provided) of the other driving gear (collision in the axial direction of the gears). Irrespective of whether the collision described above occurs or not, dog clunking noise also occurs when side surfaces of the dog projections collide with side surfaces of the dog recesses (collision in the circumferential direction of the gears).

In addition, in the transmission, dog clunking noise is not always uniform even in the same gear-shift operation. This increases a sensation of incongruity experienced by a driver. This is due to the presence of clearance between the one end of the shift fork and the side surface of the guide groove (cam groove) of the shift drum and between the other end of the shift fork and a portion of the driving gear to which the other end is connected. The presence of such clearance tends to cause a tilt of the shift fork, and the driving gear is not likely to be displaced uniformly in the axial direction.

That is, when the shift fork tilts as described above, the one driving gear that is caused to move in the axial direction by the shift fork tilts relative to the other driving gear. Accordingly, the dog projections on the one driving gear also tilt relative to the dog recesses on the other driving gear. This tilt of the dog projections on the one driving gear changes a contact state between the dog projections and the dog recesses on the other driving gear. Thus, the dog clunking noise does not tend to be uniform.

SUMMARY

In view of the above, the present invention can obtain a configuration of a transmission that can reduce a sensation of incongruity experienced by a driver due to dog clunking noise while reducing dog clunking noise.

Through intensive investigation, the inventor of the present invention has come to expect that dog clunking noise can be reduced by reducing the moment of inertia of a member related to collision. This is because if the moment of inertia of the member related to collision is small, collision energy directly related to dog clunking noise can be reduced.

In view of this, first, the inventor had an idea of separating the dog projections from the one driving gear. Specifically, the inventor had an idea of employing a configuration of a transmission in which a slider movable along the axial direction of the driving shaft is disposed between a pair of driving gears and the slider has dog projections. The other end of the shift fork is connected to the slider. In this manner, as compared to a case where the one driving gear is moved in the axial direction of the driving shaft, the mass and the radius of a member having dog projections (slider) can be reduced. Consequently, the moment of inertia of the member can be reduced. As a result, dog clunking noise can be reduced.

By relatively reducing the radius of the slider as described above, the shift fork can exert a force of moving the slider on the slider at a position closer to the driving shaft. Accordingly, while the slider moves, the posture of the slider can be stabilized. As a result, variations of dog clunking noise occurring when the dog projections of the slider contact the dog recesses of the other driving gear can be reduced.

Thus, by separating the one driving gear from the dog projections as described above, not only occurrence of dog clunking noise but also a sensation of incongruity experienced by the driver due to variations of dog clunking noise can be reduced.

Through further investigation, the inventor found that an increase in the number of dog projections and dog recesses leads to dispersion of a stress generated when the dog projections and the dog recesses mesh with each other to thereby further reduce dog clunking noise.

Since the other driving gear (free rotating gear) that contacts dog projections of the slider can rotate relative to the driving shaft on which the other driving gear is provided, the other driving gear can tilt relative to the driving shaft in some cases. The inventor found that especially when the other driving gear meshes with the driven gear (fixed gear) that does not rotate relative to the driven shaft, the other driving gear tilts greatly at this meshing point. Even in this case where the other driving gear tilts, the increase in the number of dog projections and dog recesses described above enables dispersion of a stress generated when the dog projections and the dog recesses mesh with each other. As a result, dog clunking noise can be further reduced.

Through detailed investigation, the inventor found that dog clunking noise can be reduced and a sensation of incongruity experienced by a driver due to dog clunking noise can also be reduced in a case where at least four pairs of dog projections and dog recesses mesh with each other within a range of 90 degrees at one side in the circumferential direction of the driving shaft and a range of 90 degrees at another side in the circumferential direction of the driving shaft with respect to a line connecting the shaft center of the driving shaft and a meshing point between the driven gear (fixed gear) and the other driving gear (free rotating gear).

The foregoing description is directed to, as an example, the configuration in which the slider is disposed between a pair of driving gears disposed adjacent to each other along the axial direction on the driving shaft and the slider has dog projections. Alternatively, the slider may be disposed between a pair of driven gears arranged adjacent to each other along the axial direction on the driven shaft. In this case, the slider moves along the axial direction of the driven shaft relative to the driven gear that is a free rotating gear. The driving gear or the driven gear may have dog projections with the slider having dog recesses.

The invention is not limited to the configuration in which the slider is disposed between a pair of driving gears or a pair of driven gears, and may employ a configuration in which the slider is movably disposed to one driving gear or driven gear that is a free rotating gear.

A transmission according to an aspect of the present invention is a transmission that is mounted on a vehicle. The transmission includes: a driving shaft extending in an axial direction and connected to a power source through a clutch mechanism; a driven shaft extending in the axial direction; a fixed gear integrally rotatably fixed to, in the axial direction, one shaft of the driving shaft or the driven shaft; a free rotating gear relatively rotatably fixed to, in the axial direction, another shaft of the driving shaft or the driven shaft and meshing with the fixed gear; a slider that is movable in the axial direction and integrally rotatably provided on the other shaft, without directly transferring power to a gear disposed on the one shaft; a shift drum that has a tubular or columnar shape extending in the axial direction and includes a guide groove extending in a circumferential direction on an outer peripheral surface of the shift drum, the shift drum being configured to be rotatable about a drum shaft extending in the axial direction; and a shift fork extending from the shift drum toward the slider, and having one end located in the guide groove of the shift drum and another end connected to the slider One of the slider or the free rotating gear has a plurality of dog projections. Another one of the slider or the free rotating gear has a plurality of dog recesses that mesh with at least a part of the plurality of dog projections.

The slider is configured in such a manner that movement of the shift fork in the guide groove in accordance with rotation of the shift drum causes the slider to be movable in the axial direction to a position at which at least one of the plurality of dog projections meshes with at least one of the plurality of dog recesses.

The free rotating gear rotates integrally with the slider and the other shaft while at least one of the plurality of dog projections meshes with at least one of the plurality of dog recesses because of movement of the slider in the axial direction.

At least four of the plurality of dog projections mesh with at least four of the plurality of dog recesses within a range of 90 degrees at one side in a circumferential direction of the other shaft and a range of 90 degrees at another side in the circumferential direction of the other shaft with respect to a line connecting a meshing point at which the fixed gear and the free rotating gear mesh with each other and a shaft center of the other shaft when viewed in the axial direction, while movement of the shift fork in the guide groove in accordance with rotation of the shift drum causes the slider to move toward the free rotating gear fixed to the other shaft in the axial direction to thereby cause the at least one of the plurality of dog projections to mesh with the at least one of the plurality of dog recesses.

Advantageous Effects of Invention

A transmission according to an aspect of the present invention can reduce dog clunking noise and also reduce a sensation of incongruity experienced by a driver caused by dog clunking noise.

DETAILED DESCRIPTION

Figure 1:
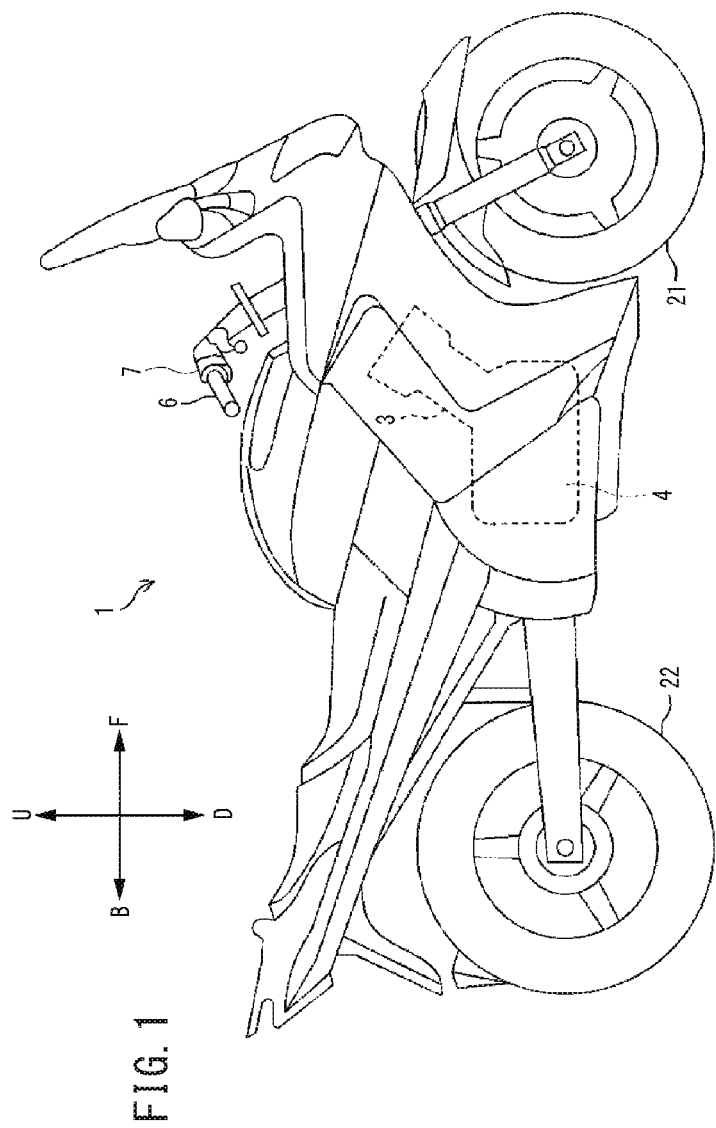
FIG. 1 is a right side view illustrating an appearance of a vehicle including a transmission according to an embodiment.

With reference to FIGS. 1 through 8, a vehicle 1 (an example of a vehicle) according to an embodiment will be described. In the drawings used in the following description, the scale factor is changed as appropriate in order to enable the members to be recognized. The "left" and "right" in the following description respectively represent the "left" and "right" when seen from a driver on the vehicle 1.

FIG. 1 illustrates an appearance of the vehicle 1 when the vehicle 1 is seen from the right. Arrow F represents the forward direction of the vehicle 1. Arrow B represents the rearward direction of the vehicle 1. Arrow U represents the upward direction of the vehicle 1. Arrow D represents the downward direction of the vehicle 1.

In this embodiment, the vehicle 1 is a motorcycle includes a front wheel 21 and a rear wheel 22. The vehicle 1 includes an internal combustion engine 3 (an example of a power source) and a transmission 4. In other words, the transmission 4 is mounted on the vehicle 1.

Figure 2A:
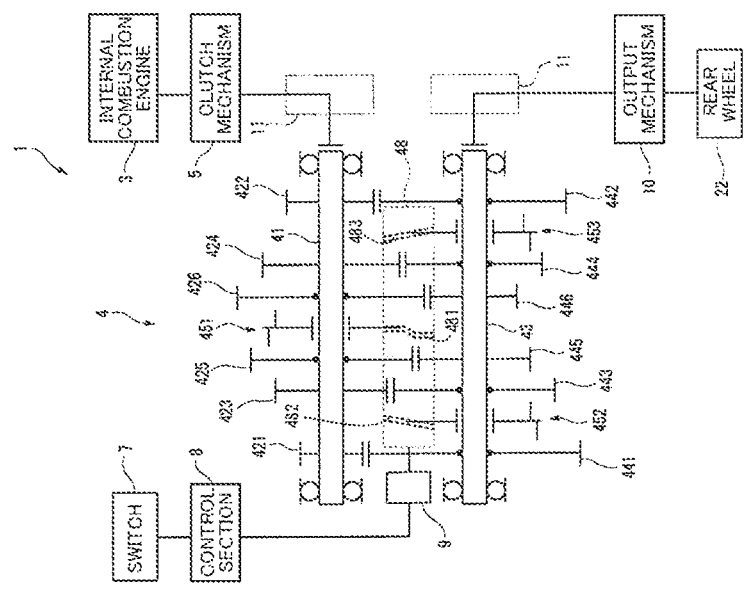
FIG. 2A is a view schematically illustrating a configuration of the transmission.
Figure 2B:
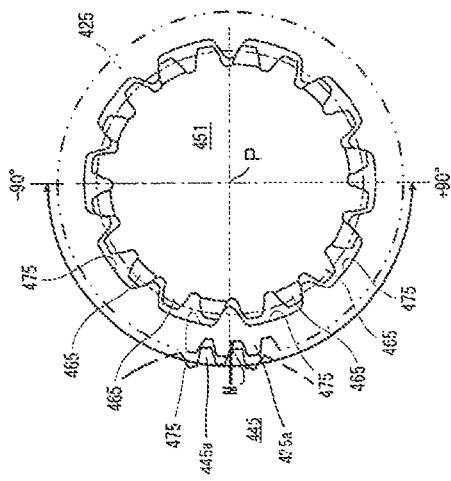
FIGS. 2B and 2C are views schematically illustrating configurations of a slider and a driving gear of the transmission.
Figure 2C:
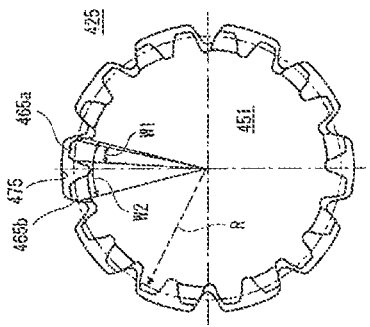

FIG. 2 illustrates a configuration of the transmission 4 according to this embodiment. Specifically, FIG. 2A schematically illustrates a configuration of the transmission 4. FIGS. 2B and 2C schematically illustrate configurations of a first slider 451 and a fifth-speed driving gear 425 described later of the transmission 4.

Figure 3:
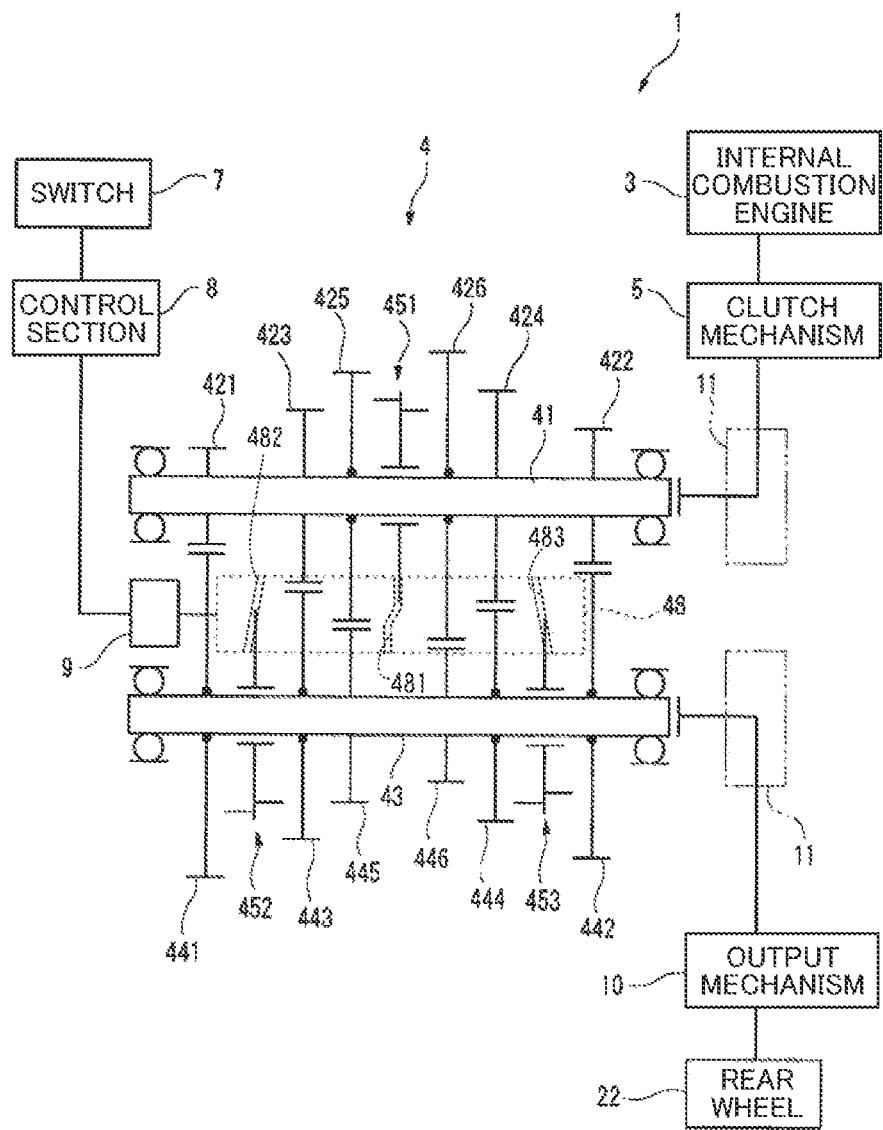
FIG. 3 is a view schematically illustrating a configuration of the transmission.

FIG. 3 is an enlarged view of FIG. 2A. The transmission 4 includes a driving shaft 41. The vehicle 1 includes a clutch mechanism 5. The driving shaft 41 is connected to the internal combustion engine 3 through the clutch mechanism 5. In the following description, the direction in which the driving shaft 41 extends is defined as an "axial direction."

The clutch mechanism 5 is configured to be switched between a connected state in which rotation of the crankshaft in the internal combustion engine 3 is transferred to the driving shaft 41 and a disconnected state in which rotation of the crankshaft is not transferred to the driving shaft 41.

The transmission 4 includes a first-speed driving gear 421, a second-speed driving gear 422, a third-speed driving gear 423, a fourth-speed driving gear 424, a fifth-speed driving gear 425, and a sixth-speed driving gear 426. The first-speed driving gear 421, the second-speed driving gear 422, the third-speed driving gear 423, the fourth-speed driving gear 424, the fifth-speed driving gear 425, and the sixth-speed driving gear 426 are arranged along the axial direction on the driving shaft 41.

The transmission 4 includes a driven shaft 43. The driven shaft 43 extends in the axial direction. That is, the driven shaft 43 extends in parallel with the driving shaft 41. The driven shaft 43 extends in the axial direction of the driving shaft 41. The expression that the driving shaft 41 or the driven shaft 43 extends in the axial direction refers to a configuration in which the driving shaft 41 or the driven shaft 43 has a shape elongated in the axial direction.

The transmission 4 includes a first-speed driven gear 441, a second-speed driven gear 442, a third-speed driven gear 443, a fourth-speed driven gear 444, a fifth-speed driven gear 445, and a sixth-speed driven gear 446. The first-speed driven gear 441, the second-speed driven gear 442, the third-speed driven gear 443, the fourth-speed driven gear 444, the fifth-speed driven gear 445, and the sixth-speed driven gear 446 are arranged along the axial direction on the driven shaft 43.

The first-speed driven gear 441 always meshes with the first-speed driving gear 421. The second-speed driven gear 442 always meshes with the second-speed driving gear 422. The third-speed driven gear 443 always meshes with the third-speed driving gear 423. The fourth-speed driven gear 444 always meshes with the fourth-speed driving gear 424. The fifth-speed driven gear 445 always meshes with the fifth-speed driving gear 425. The sixth-speed driven gear 446 always meshes with the sixth-speed driving gear 426.

The first-speed driving gear 421 is not rotatable on the driving shaft 41. That is, the first-speed driving gear 421 can rotate integrally with the driving shaft 41. The first-speed driven gear 441 is rotatable relative to the driven shaft 43.

The second-speed driving gear 422 is not rotatable on the driving shaft 41. That is, the second-speed driving gear 422 can rotate integrally with the driving shaft 41. The second-speed driven gear 442 is rotatable relative to the driven shaft 43.

The third-speed driving gear 423 is not rotatable on the driving shaft 41. That is, the third-speed driving gear 423 can rotate integrally with the driving shaft 41. The third-speed driven gear 443 is rotatable relative to the driven shaft 43.

The fourth-speed driving gear 424 is not rotatable on the driving shaft 41. That is, the fourth-speed driving gear 424 can rotate integrally with the driving shaft 41. The fourth-speed driven gear 444 is rotatable relative to the driven shaft 43.

The fifth-speed driving gear 425 is rotatable relative to the driving shaft 41. The fifth-speed driven gear 445 is not rotatable on the driven shaft 43. That is, the fifth-speed driven gear 445 can rotate integrally with the driven shaft 43.

The sixth-speed driving gear 426 is rotatable relative to the driving shaft 41. The sixth-speed driven gear 446 is not rotatable on the driven shaft 43. That is, the sixth-speed driven gear 446 can rotate integrally with the driven shaft 43.

The first-speed driving gear 421, the second-speed driving gear 422, and the fifth-speed driven gear 445 are examples of a fixed gear. The third-speed driving gear 423, the fourth-speed driving gear 424, and the sixth-speed driven gear 446 are examples of a second fixed gear.

The first-speed driven gear 441, the second-speed driven gear 442, and the fifth-speed driving gear 425 are examples of free rotating gears that mesh with the fixed gears. The third-speed driven gear 443, the fourth-speed driven gear 444, and the sixth-speed driving gear 426 are examples of a second free rotating gear that meshes with the second fixed gear.

The transmission 4 includes a first slider 451. The first slider 451 is disposed on the driving shaft 41 between the fifth-speed driving gear 425 (an example of the one driving gear) and the sixth-speed driving gear 426 (an example of the other driving gear). The first slider 451 is movable on the driving shaft 41 in the axial direction. The first slider 451 is not rotatable on the driving shaft 41. That is, the first slider 451 can rotate integrally with the driving shaft 41.

The transmission 4 includes a second slider 452. The second slider 452 is disposed on the driven shaft 43 between the first-speed driven gear 441 (an example of the first driven gear) and the third-speed driven gear 443 (an example of the second driven gear). The second slider 452 is movable in the axial direction on the driven shaft 43. The second slider 452 is not rotatable on the driven shaft 43. That is, the second slider 452 can rotate integrally with the driven shaft 43.

The transmission 4 includes a third slider 453. The third slider 453 is disposed on the driven shaft 43 between the second-speed driven gear 442 (an example of the first driven gear) and the fourth-speed driven gear 444 (an example of the second driven gear). The third slider 453 is movable in the axial direction on the driven shaft 43. The third slider 453 is not rotatable on the driven shaft 43. That is, the third slider 453 can rotate integrally with the driven shaft 43.

The first slider 451, the second slider 452, and the third slider 453 are examples of sliders.

Figure 4:
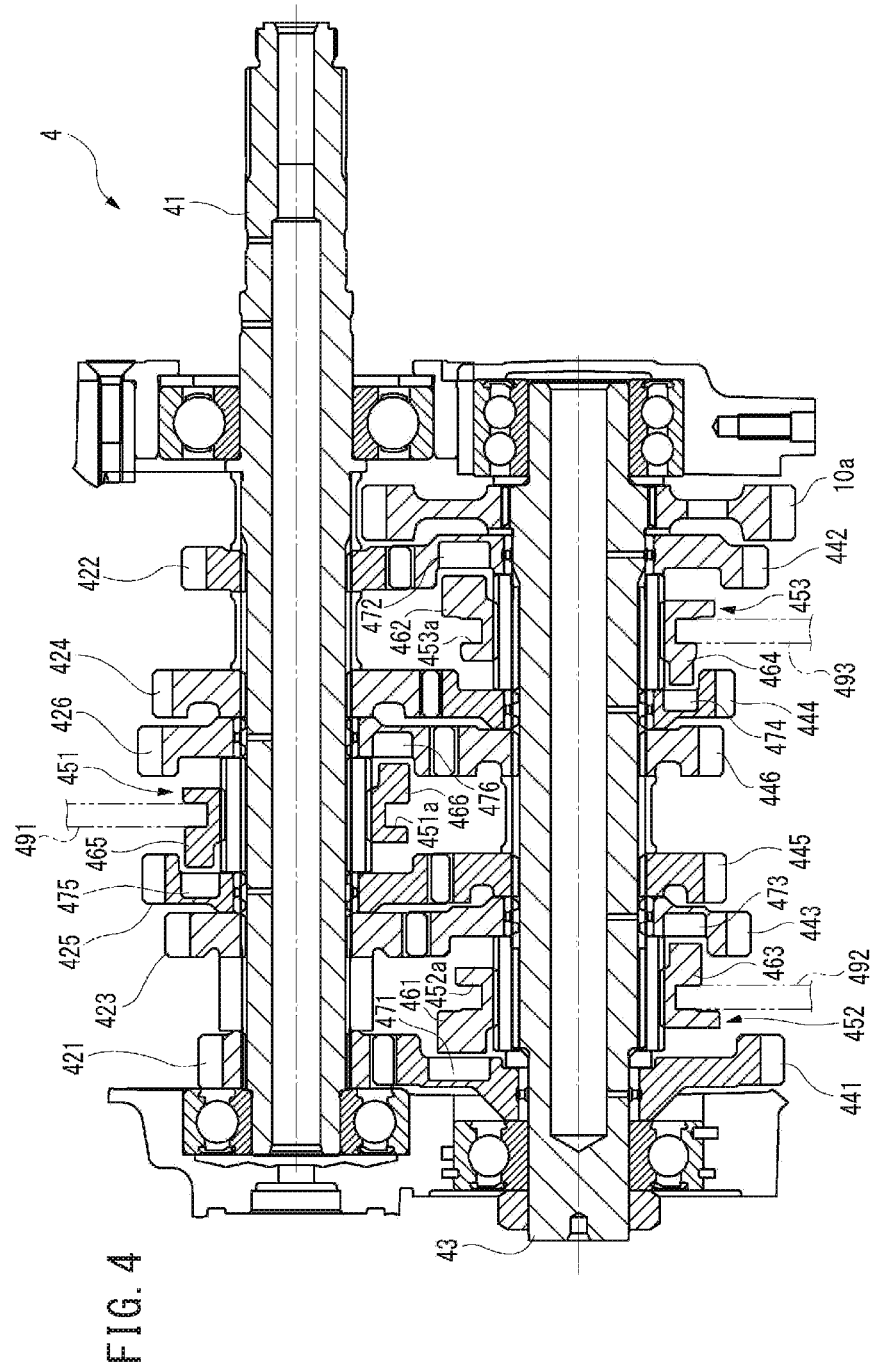
FIG. 4 is a cross-sectional view partially illustrating an example of a specific configuration of the transmission.

FIG. 4 is a view illustrating a further detailed configuration of the transmission 4. FIG. 4 is a view illustrating a cross section of the transmission 4 including an axis extending in the axial direction of the driving shaft 41 and the driven shaft 43.

The transmission 4 includes fifth-speed dog projections 465 and fifth-speed dog recesses 475. The fifth-speed dog projections 465 (an example of dog projections) are provided on the first slider 451. The fifth-speed dog recesses 475 (an example of dog recesses) are provided on the fifth-speed driving gear 425.

The transmission 4 includes sixth-speed dog projections 466 and sixth-speed dog recesses 476. The sixth-speed dog projections 466 (an example of second dog projections) are provided on the first slider 451. The sixth-speed dog recesses 476 (an example of second dog recesses) are provided on the sixth-speed driving gear 426.

Figure 5A:
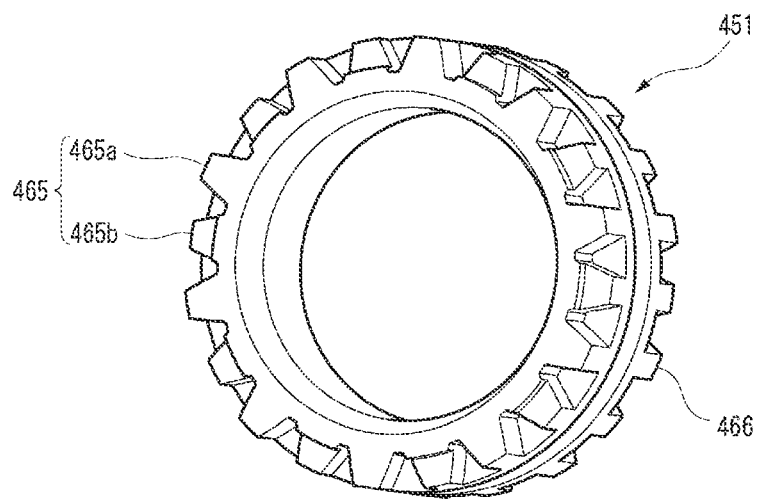
FIG. 5A is a perspective view of a schematic configuration of the slider in the transmission and FIG. 5B is a perspective view of a schematic configuration of the driving gear in the transmission.
Figure 5B:
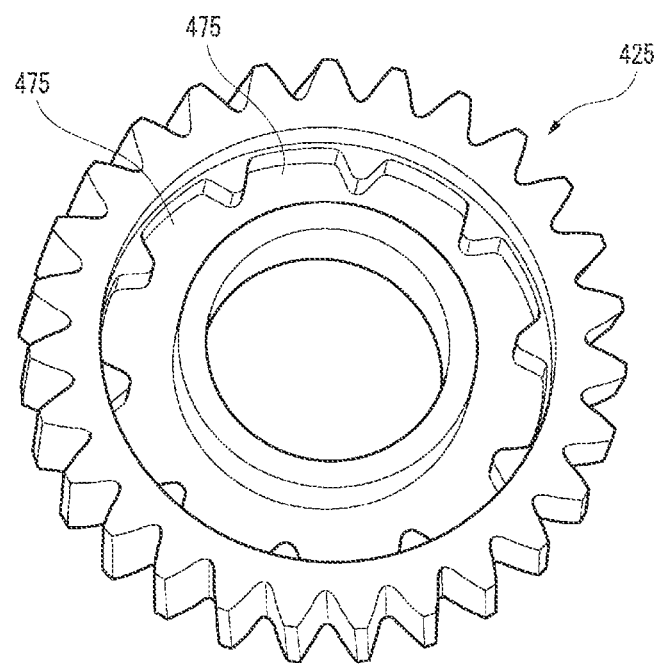
Figure 6:
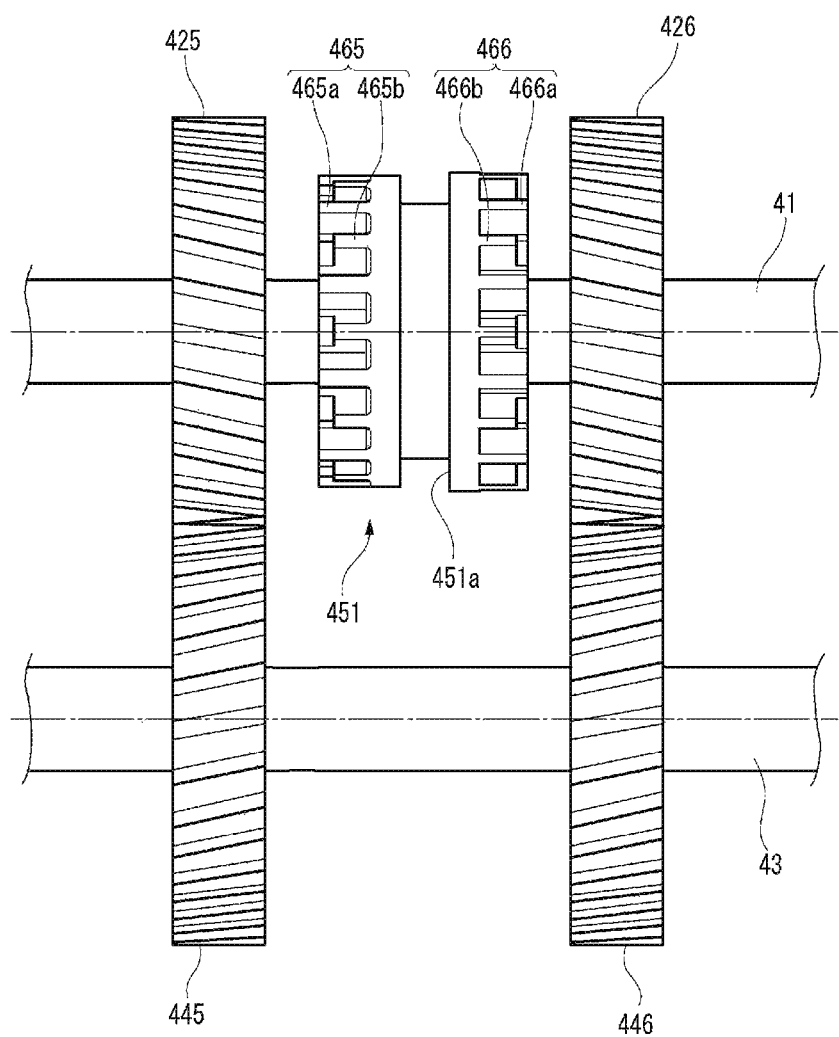
FIG. 6 is a view illustrating an example of arrangement of the slider and the driving gear of the transmission.

FIG. 5A is a perspective view illustrating an appearance of the first slider 451. The first slider 451 has a ring shape. FIG. 5B is a perspective view illustrating an appearance of the fifth-speed driving gear 425. FIG. 6 is a view illustrating the fifth-speed driving gear 425, the sixth-speed driving gear 426, and the first slider 451 disposed on the driving shaft 41 together with the fifth-speed driven gear 445 and the sixth-speed driven gear 446 disposed on the driven shaft 43.

As illustrated in FIG. 5A, on the first slider 451, the plurality of fifth-speed dog projections 465 are arranged along the circumferential direction. As also clearly shown in FIG. 6, the plurality of fifth-speed dog projections 465 include two types of fifth-speed dog projections 465a and 465b having different lengths along the axial direction. In the axial direction, the length of the fifth-speed dog projections 465a is larger than that of the fifth-speed dog projections 465b. The fifth-speed dog projections 465a and the fifth-speed dog projections 465b are alternately arranged along the circumferential direction on the first slider 451.

On the first slider 451, the plurality of sixth-speed dog projections 466 are arranged along the circumferential direction about the driving shaft 41. As illustrated in FIG. 6, the plurality of sixth-speed dog projections 466 include two types of sixth-speed dog projections 466a and 466b having different lengths along the axial direction. In the axial direction, the length of the sixth-speed dog projections 466a is larger than that of the sixth-speed dog projections 466b. The sixth-speed dog projections 466a and the sixth-speed dog projections 466b are alternately arranged along the circumferential direction on the first slider 451.

As illustrated in FIG. 5B, on the fifth-speed driving gear 425, the plurality of fifth-speed dog recesses 475 are arranged along the circumferential direction of the fifth-speed driving gear 425. The number of the plurality of fifth-speed dog recesses 475 is a half of the number of the plurality of fifth-speed dog projections 465. That is, each of the fifth-speed dog recesses 475 is configured to accommodate two of the fifth-speed dog projections 465.

Although not shown because of a configuration similar to that of the fifth-speed driving gear 425, the sixth-speed driving gear 426 has the plurality of sixth-speed dog recesses 476 arranged along the circumferential direction of the sixth-speed driving gear 426. The number of the plurality of sixth-speed dog recesses 476 is a half of the number of the plurality of sixth-speed dog projections 466. That is, each of the sixth-speed dog recesses 476 is configured to accommodate two of the sixth-speed dog projections 466.

As illustrated in FIG. 4, the transmission 4 includes first-speed dog projections 461 and first-speed dog recesses 471. The first-speed dog projections 461 (an example of the dog projections) are provided on the second slider 452. The first-speed dog recesses 471 (an example of the dog recesses) are provided on the first-speed driven gear 441.

As illustrated in FIG. 4, the transmission 4 includes third-speed dog projections 463 and third-speed dog recesses 473. The third-speed dog projections 463 (an example of the second dog projections) are provided on the second slider 452. The third-speed dog recesses 473 (an example of the second dog recesses) are provided on the third-speed driven gear 443.

Although not shown because of a configuration similar to that of the first slider 451, the second slider 452 has a ring shape. The plurality of first-speed dog projections 461 are arranged along the circumferential direction on the second slider 452. The plurality of first-speed dog projections 461 include two types of first-speed dog projections having different lengths along the axial direction of the driving shaft 41. The relatively long first-speed dog projections and the relatively short first-speed dog projections are alternately arranged along the circumferential direction on the second slider 452.

The plurality of third-speed dog projections 463 are arranged along the circumferential direction on the second slider 452. The plurality of third-speed dog projections 463 include two types of third-speed dog projections having different lengths along the axial direction. The relatively long third-speed dog projections and the relatively short third-speed dog projections are alternately arranged along the circumferential direction on the second slider 452.

Although not shown because of a configuration similar to that of the fifth-speed driving gear 425, the plurality of first-speed dog recesses 471 are arranged on the first-speed driven gear 441 along the circumferential direction of the first-speed driven gear 441. The number of the plurality of first-speed dog recesses 471 is a half of the number of the plurality of first-speed dog projections 461. That is, each of the first-speed dog recesses 471 is configured to accommodate two of the first-speed dog projections 461.

The plurality of third-speed dog recesses 473 are arranged along the circumferential direction of the third-speed driven gear 443 on the third-speed driven gear 443. The number of the plurality of third-speed dog recesses 473 is a half of the number of the plurality of third-speed dog projections 463. That is, each of the third-speed dog recesses 473 is configured to accommodate two of the third-speed dog projections 463.

As illustrated in FIG. 4, the transmission 4 includes second-speed dog projections 462 and second-speed dog recesses 472. The second-speed dog projections 462 (an example of the dog projections) are provided on the third slider 453. The second-speed dog recesses 472 (an example of the dog recesses) are provided on the second-speed driven gear 442.

As illustrated in FIG. 4, the transmission 4 includes fourth-speed dog projections 464 and fourth-speed dog recesses 474. The fourth-speed dog projections 464 (an example of the second dog projections) are provided on the third slider 453. The fourth-speed dog recesses 474 (an example of the second dog recesses) are provided on the fourth-speed driven gear 444.

Although not shown because of a configuration similar to that of the first slider 451, the third slider 453 has a ring shape. The plurality of second-speed dog projections 462 are arranged along the circumferential direction on the third slider 453. The plurality of second-speed dog projections 462 include two types of second-speed dog projections having different lengths along the axial direction of the driven shaft 43. The relatively long second-speed dog projections and the relatively short second-speed dog projections are alternately arranged along the circumferential direction on the third slider 453.

The plurality of fourth-speed dog projections 464 are arranged along the circumferential direction on the third slider 453. The plurality of fourth-speed dog projections 464 include two types of fourth-speed dog projections having different lengths along the axial direction. The relatively long fourth-speed dog projections and the relatively short fourth-speed dog projections are alternately arranged along the circumferential direction on the third slider 453.

Although not shown because of a configuration similar to that of the fifth-speed driving gear 425, the plurality of second-speed dog recesses 472 are arranged along the circumferential direction of the second-speed driven gear 442 on the second-speed driven gear 442. The number of the plurality of second-speed dog recesses 472 is a half of the number of the plurality of second-speed dog projections 462. That is, each of the second-speed dog recesses 472 is configured to accommodate two of the second-speed dog projections 462.

The plurality of fourth-speed dog recesses 474 are arranged along the circumferential direction of the fourth-speed driven gear 444 on the fourth-speed driven gear 444. The number of the plurality of fourth-speed dog recesses 474 is a half of the number of the plurality of fourth-speed dog projections 464. That is, each of the fourth-speed dog recesses 474 is configured to accommodate two of the fourth-speed dog projections 464.

Figure 7:
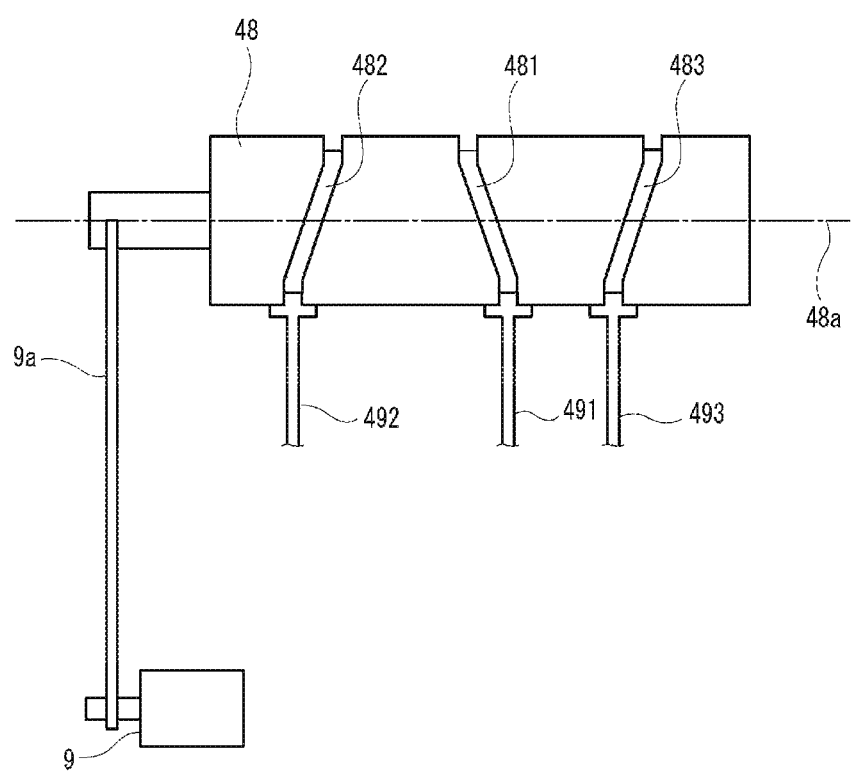
FIG. 7 is a view schematically illustrating a configuration of a shift drum of the transmission.

As illustrated in FIG. 3, the transmission 4 includes a shift drum 48. FIG. 7 illustrates a specific configuration of the shift drum 48. The shift drum 48 is columnar. The shift drum 48 includes a drum shaft 48a extending in the axial direction. The shift drum 48 is rotatable about the drum shaft 48a.

A first guide groove 481, a second guide groove 482, and a third guide groove 483 are formed on the outer peripheral surface of the shift drum 48. The first guide groove 481, the second guide groove 482, and the third guide groove 483 are provided on the outer peripheral surface of the shift drum 48 in such a manner that the positions of these grooves in the direction along the drum shaft 48a (i.e., the axial direction) change in accordance with the rotation angle about the drum shaft 48a of the shift drum 48. The outer peripheral surface of the shift drum 48 is the side surface of the columnar shift drum 48 surrounding the drum shaft 48a.

The transmission 4 includes a first shift fork 491, a second shift fork 492, and a third shift fork 493. The first shift fork 491 extends from the shift drum 48 toward the first slider 451. The second shift fork 492 extends from the shift drum 48 toward the second slider 452. The third shift fork 493 extends from the shift drum 48 toward the third slider 453. The expression of extending from the shift drum toward the slider refers to a state in which one end of the shift fork in the longitudinal direction is connected to the shift drum and another end of the shift fork in the longitudinal direction is connected to the slider.

An end of the first shift fork 491 in the longitudinal direction is located in the first guide groove 481 of the shift drum 48. An end of the second shift fork 492 in the longitudinal direction is located in the second guide groove 482 of the shift drum 48. An end of the third shift fork 493 in the longitudinal direction is located in the third guide groove 483 of the shift drum 48.

As illustrated in FIG. 4, a first fork receiving groove 451a is formed in the first slider 451. A second fork receiving groove 452a is formed on the second slider 452. A third fork receiving groove 453a is formed on the third slider 453.

As indicated by chain double-dashed lines in FIG. 4, the other end of the first shift fork 491 in the longitudinal direction is connected to the first fork receiving groove 451a of the first slider 451. The other end of the second shift fork 492 in the longitudinal direction is connected to the second fork receiving groove 452a of the second slider 452. The other end of the third shift fork 493 in the longitudinal direction is connected to the third fork receiving groove 453a of the third slider 453.

That is, the first shift fork 491 couples the shift drum 48 and the first slider 451 to each other. The second shift fork 492 couples the shift drum 48 and the second slider 452 to each other. The third shift fork 493 couples the shift drum 48 and the third slider 453 to each other.

The transmission 4 of the vehicle 1 according to this embodiment has a configuration capable of performing six-stage gear-shift. Specifically, there are differences among a transmission ratio between the first-speed driving gear 421 and the first-speed driven gear 441, a transmission ratio between the second-speed driving gear 422 and the second-speed driven gear 442, a transmission ratio between the third-speed driving gear 423 and the third-speed driven gear 443, a transmission ratio between the fourth-speed driving gear 424 and the fourth-speed driven gear 444, a transmission ratio between the fifth-speed driving gear 425 and the fifth-speed driven gear 445, and a transmission ratio between the sixth-speed driving gear 426 and the sixth-speed driven gear 446.

As illustrated in FIG. 1, the vehicle 1 includes a handlebar 6. The handlebar 6 is configured to change the direction of the front wheel 21 in accordance with an operation of a driver. The change of the direction of the front wheel 21 changes the travelling direction of the vehicle 1.

A illustrated in FIGS. 1 and 3, the vehicle 1 includes a switch 7, a control section 8, and an electric actuator 9.

The switch 7 is provided on the handlebar 6. The switch 7 is configured to be operated by the driver to thereby output a signal for causing the transmission 4 to perform a gearshift operation.

The control section 8 is configured to output a signal for controlling an operation of the electric actuator 9 in accordance with a signal input from the switch 7.

As illustrated in FIG. 7, the electric actuator 9 is coupled to the shift drum 48 through a rod 9a. The electric actuator 9 is configured to rotate the shift drum 48 about the drum shaft 48a in accordance with a signal input from the control section 8 through the rod 9a. That is, the electric actuator 9 is configured to rotate the shift drum 48 in accordance with an operation of the switch 7. The rotation angle of the shift drum 48 is determined depending on a selected gear stage.

In this manner, in accordance with the angle of rotation of the shift drum 48 about the drum shaft 48a, the positions of the first shift fork 491, the second shift fork 492, and the third shift fork 493 change in the direction along the drum shaft 48a (i.e., the axial direction). Thus, in accordance with the angle of rotation of the shift drum 48 about the drum shaft 48a, the first slider 451 moves on the driving shaft 41, and the second slider 452 and the third slider 453 move on the driven shaft 43.

When a driver selects the first speed with the switch 7, the second shift fork 492 causes the second slider 452 to move along the driven shaft 43. Accordingly, the first-speed dog projections 461 provided on the second slider 452 mesh with the first-speed dog recesses 471 provided on the first-speed driven gear 441. The third-speed dog projections 463 do not mesh with the third-speed dog recesses 473 provided on the third-speed driven gear 443. Thus, the third-speed driven gear 443 rotates idly on the driven shaft 43.

At this time, the first shift fork 491 causes the first slider 451 to be located in a neutral position. When the first slider 451 is in the neutral position, the fifth-speed dog projections 465 and the fifth-speed dog recesses 475 do not mesh with each other, and the sixth-speed dog projections 466 and the sixth-speed dog recesses 476 do not mesh with each other, either. Thus, the fifth-speed driving gear 425 and the sixth-speed driving gear 426 rotate idly on the driving shaft 41.

The third shift fork 493 causes the third slider 453 to be located in the neutral position. When the third slider 453 is in the neutral position, the second-speed dog projections 462 and the second-speed dog recesses 472 do not mesh with each other, and the fourth-speed dog projections 464 and the fourth-speed dog recesses 474 do not mesh with each other. Thus, the second-speed driven gear 442 and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the first-speed driving gear 421 and the first-speed driven gear 441.

Here, the expression that dog projections and dog recesses mesh with each other refers to a state in which the dog projections and the dog recesses at least partially contact each other and transfer power.

As illustrated in FIG. 3, the vehicle 1 includes an output mechanism 10. The output mechanism 10 is connected to the rear wheel 22. As illustrated in FIG. 4, the output mechanism 10 includes an output gear 10a. The output gear 10a is disposed on the driven shaft 43. The output gear 10a is not rotatable on the driven shaft 43.

Thus, power transferred to the driven shaft 43 through the first-speed driving gear 421 and the first-speed driven gear 441 is transferred to the rear wheel 22 through the output mechanism 10 including the output gear 10a.

When a driver selects the second speed with the switch 7, the third shift fork 493 causes the third slider 453 to move along the driven shaft 43. Accordingly, the second-speed dog projections 462 provided on the third slider 453 mesh with the second-speed dog recesses 472 provided on the second-speed driven gear 442. The fourth-speed dog projections 464 and the fourth-speed dog recesses 474 provided on the fourth-speed driven gear 444 do not mesh with each other. Thus, the fourth-speed driven gear 444 rotates idly on the driven shaft 43.

At this time, the first shift fork 491 causes the first slider 451 to be located in a neutral position. When the first slider 451 is in the neutral position, the fifth-speed dog projections 465 and the fifth-speed dog recesses 475 do not mesh with each other, and the sixth-speed dog projections 466 and the sixth-speed dog recesses 476 do not mesh with each other, either. Thus, the fifth-speed driving gear 425 and the sixth-speed driving gear 426 rotate idly on the driving shaft 41.

The second shift fork 492 causes the second slider 452 to be located in the neutral position. When the second slider 452 is in the neutral position, the first-speed dog projections 461 and the first-speed dog recesses 471 do not mesh with each other, and the third-speed dog projections 463 and the third-speed dog recesses 473 do not mesh with each other, either. Thus, the first-speed driven gear 441 and the third-speed driven gear 443 rotate idly on the driven shaft 43.

In this manner, power transferred from the internal combustion engine 3 to the driving shaft 41 through the clutch mechanism 5 is transferred to the driven shaft 43 through the second-speed driving gear 422 and the second-speed driven gear 442.

Thus, power transferred to the driven shaft 43 through the second-speed driving gear 422 and the second-speed driven gear 442 is transferred to the rear wheel 22 through the output mechanism 10 including the output gear 10a.

When the driver selects the third speed with the switch 7, the second shift fork 492 causes the second slider 452 to move along the driven shaft 43. Accordingly, the third-speed dog projections 463 provided on the second slider 452 mesh with the third-speed dog recesses 473 provided on the third-speed driven gear 443. The first-speed dog projections 461 and the first-speed dog recesses 471 provided on the first-speed driven gear 441 do not mesh with each other. Thus, the first-speed driven gear 441 rotates idly on the driven shaft 43.

At this time, the first shift fork 491 causes the first slider 451 to be located in a neutral position. When the first slider 451 is in the neutral position, the fifth-speed dog projections 465 and the fifth-speed dog recesses 475 do not mesh with each other, and the sixth-speed dog projections 466 and the sixth-speed dog recesses 476 do not mesh with each other, either. Thus, the fifth-speed driving gear 425 and the sixth-speed driving gear 426 rotate idly on the driving shaft 41.

The third shift fork 493 causes the third slider 453 to be located in the neutral position. When the third slider 453 is in the neutral position, the second-speed dog projections 462 and the second-speed dog recesses 472 do not mesh with each other, and the fourth-speed dog projections 464 and the fourth-speed dog recesses 474 do not mesh with each other. Thus, the second-speed driven gear 442 and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the third-speed driving gear 423 and the third-speed driven gear 443.

Thus, power transferred to the driven shaft 43 through the third-speed driving gear 423 and the third-speed driven gear 443 is transferred to the rear wheel 22 through the output mechanism 10 including the output gear 10a.

When the driver selects the fourth speed with the switch 7, the third shift fork 493 causes the third slider 453 to move along the driven shaft 43. Accordingly, the fourth-speed dog projections 464 provided on the third slider 453 mesh with the fourth-speed dog recesses 474 provided on the fourth-speed driven gear 444. The second-speed dog projections 462 and the second-speed dog recesses 472 provided on the second-speed driven gear 442 do not mesh with each other. Thus, the second-speed driven gear 442 rotates idly on the driven shaft 43.

At this time, the first shift fork 491 causes the first slider 451 to be located in a neutral position. When the first slider 451 is in the neutral position, the fifth-speed dog projections 465 and the fifth-speed dog recesses 475 do not mesh with each other, and the sixth-speed dog projections 466 and the sixth-speed dog recesses 476 do not mesh with each other, either. Thus, the fifth-speed driving gear 425 and the sixth-speed driving gear 426 rotate idly on the driving shaft 41.

The second shift fork 492 causes the second slider 452 to be located in the neutral position. When the second slider 452 is in the neutral position, the first-speed dog projections 461 and the first-speed dog recesses 471 do not mesh with each other, and the third-speed dog projections 463 and the third-speed dog recesses 473 do not mesh with each other, either. Thus, the first-speed driven gear 441 and the third-speed driven gear 443 rotate idly on the driven shaft 43.

In this manner, power transferred from the internal combustion engine 3 to the driving shaft 41 through the clutch mechanism 5 is transferred to the driven shaft 43 through the fourth-speed driving gear 424 and the fourth-speed driven gear 444.

Thus, power transferred to the driven shaft 43 through the fourth-speed driving gear 424 and the fourth-speed driven gear 444 is transferred to the rear wheel 22 through the output mechanism 10 including the output gear 10a.

When a driver selects the fifth speed with the switch 7, the first shift fork 491 causes the first slider 451 to move along the driving shaft 41. Accordingly, the fifth-speed dog projections 465 provided on the first slider 451 mesh with the fifth-speed dog recesses 475 provided on the fifth-speed driving gear 425. The sixth-speed dog projections 466 and the sixth-speed dog recesses 476 provided on the sixth-speed driving gear 426 do not mesh with each other. Thus, the sixth-speed driving gear 426 rotates idly on the driving shaft 41.

At this time, the second shift fork 492 causes the second slider 452 to move to the neutral position. When the second slider 452 is in the neutral position, the first-speed dog projections 461 and the first-speed dog recesses 471 do not mesh with each other, and the third-speed dog projections 463 and the third-speed dog recesses 473 do not mesh with each other, either. The third shift fork 493 causes the third slider 453 to move to the neutral position. When the third slider 453 is in the neutral position, the second-speed dog projections 462 and the second-speed dog recesses 472 do not mesh with each other, and the fourth-speed dog projections 464 and the fourth-speed dog recesses 474 do not mesh with each other. Thus, the first-speed driven gear 441, the second-speed driven gear 442, the third-speed driven gear 443, and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the fifth-speed driving gear 425 and the fifth-speed driven gear 445.

Thus, power transferred to the driven shaft 43 through the fifth-speed driving gear 425 and the fifth-speed driven gear 445 is transferred to the rear wheel 22 through the output mechanism 10 including the output gear 10a.

When the driver selects the sixth speed with the switch 7, the first shift fork 491 causes the first slider 451 to move along the driving shaft 41. Accordingly, the sixth-speed dog projections 466 provided on the first slider 451 mesh with the sixth-speed dog recesses 476 provided on the sixth-speed driving gear 426. The fifth-speed dog projections 465 and the fifth-speed dog recesses 475 provided on the fifth-speed driving gear 425 do not mesh with each other. Thus, the fifth-speed driving gear 425 rotates idly on the driving shaft 41.

At this time, the second shift fork 492 causes the second slider 452 to be located in the neutral position. When the second slider 452 is in the neutral position, the first-speed dog projections 461 and the first-speed dog recesses 471 do not mesh with each other, and the third-speed dog projections 463 and the third-speed dog recesses 473 do not mesh with each other, either. The third shift fork 493 causes the third slider 453 to be located in the neutral position. When the third slider 453 is in the neutral position, the second-speed dog projections 462 and the second-speed dog recesses 472 do not mesh with each other, and the fourth-speed dog projections 464 and the fourth-speed dog recesses 474 do not mesh with each other. Thus, the first-speed driven gear 441, the second-speed driven gear 442, the third-speed driven gear 443, and the fourth-speed driven gear 444 rotate idly on the driven shaft 43.

In this manner, power transferred from the internal combustion engine 3 to the driving shaft 41 through the clutch mechanism 5 is transferred to the driven shaft 43 through the sixth-speed driving gear 426 and the sixth-speed driven gear 446.

Thus, power transferred to the driven shaft 43 through the sixth-speed driving gear 426 and the sixth-speed driven gear 446 is transferred to the rear wheel 22 through the output mechanism 10 including the output gear 10a.

In the transmission in which a power transfer path is formed by meshing between the dog projections and the dog recesses, occurrence of dog clunking noise in gear-shift is unavoidable. That is, in a gear-shift operation of the transmission, the dog projections contact a member having dog recesses, and thus, dog clunking noise occurs. The inventor expected that dog clunking noise can be reduced by reducing the moment of inertia of a member related to collision. This is because if the moment of inertia of the member related to collision is small, collision energy directly related to dog clunking noise can be reduced. In view of this, first, the inventor had an idea of separating the dog projections from the gear related to power transfer.

In the transmission 4 according to this embodiment, the first slider 451 is disposed between the fifth-speed driving gear 425 and the sixth-speed driving gear 426 that are adjacent to each other. The first slider 451 can be displaced along the driving shaft 41. The first slider 451 includes the fifth-speed dog projections 465 and the sixth-speed dog projections 466. The first shift fork 491 is connected to the first slider 451.

The first slider 451 is not provided with a gear that meshes with a gear (power transferring member) on the driven shaft 43. That is, the first slider 451 does not directly transfer power to the gear on the driven shaft 43. In other words, the first slider 451 does not have a configuration that transfers power to another member, except the fifth-speed dog projections 465 and the sixth-speed dog projections 466. That is, the first slider 451 transfers power to the driven shaft 43 by using only either the fifth-speed driving gear 425 and the fifth-speed driven gear 445 or the sixth-speed driving gear 426 and the sixth-speed driven gear 446.

In this manner, as compared to the case where a driving gear having dog projections itself is displaced along the driving shaft, the mass and the radius of a member having dog projections related to collision (first slider 451) can be reduced. Thus, the moment of inertia of the member can be reduced. As a result, dog clunking noise can be reduced.

By relatively reducing the radius of the first slider 451 as described above, a force that enables the first shift fork 491 to displace the first slider 451 can be exerted on the first slider 451 at a position near the driving shaft 41. Accordingly, the posture of the first slider 451 in the displacement of the first slider 451 can be easily stabilized. Thus, not only occurrence of dog clunking noise but also a sensation of incongruity experienced by a driver due to variations of dog clunking noise can be reduced.

In addition, by reducing the radius of the first slider 451 as described above, the peripheral speed of a portion having the first fork receiving groove 451a in the first slider 451 that rotates together with the driving shaft 41 can be reduced. In this manner, a force exerted on a portion at which the first shift fork 491 contacts the inner surface of the first fork receiving groove 451a can be reduced. As a result, abrasion of the first shift fork 491 can also be reduced.

In the transmission 4 according to this embodiment, the second slider 452 is disposed between the first-speed driven gear 441 and the third-speed driven gear 443 that are adjacent to each other. The second slider 452 can be displaced along the driven shaft 43. The second slider 452 includes the first-speed dog projections 461 and the third-speed dog projections 463. The second shift fork 492 is connected to the second slider 452.

The third slider 453 is disposed between the second-speed driven gear 442 and the fourth-speed driven gear 444 that are adjacent to each other. The third slider 453 can be displaced along the driven shaft 43. The third slider 453 has the second-speed dog projections 462 and the fourth-speed dog projections 464. The third shift fork 493 is connected to the third slider 453.

The second slider 452 is not provided with a gear that meshes with a gear (power transferring member) on the driving shaft 41. That is, the second slider 452 does not directly perform power transfer to the gear on the driving shaft 41. In other words, the second slider 452 does not have a configuration that transfers power to another member, except the first-speed dog projections 461 and the third-speed dog projections 463. That is, the second slider 452 transfers power to the driving shaft 41 by using only either the first-speed driving gear 421 and the first-speed driven gear 441 or the third-speed driving gear 423 and the third-speed driven gear 443.

The third slider 453 is not provided with a gear that meshes with a gear (power transferring member) on the driving shaft 41. That is, the third slider 453 does not directly transfer power to the gear on the driving shaft 41. In other words, the third slider 453 does not have a configuration that transfers power to another member, except the second-speed dog projections 462 and the fourth-speed dog projections 464. That is, the third slider 453 transfers power to the driving shaft 41 by using only either the second-speed driving gear 422 and the second-speed driven gear 442 or the fourth-speed driving gear 424 and the fourth-speed driven gear 444.

In this manner, as compared to the case where a driven gear having dog projections itself is displaced along the driven shaft, the mass and the radius of a member having dog projections (second slider 452 and third slider 453) related to collision can be reduced. Thus, the moment of inertia of the member can be reduced. As a result, dog clunking noise can be reduced.

By relatively reducing the radius of the second slider 452, a force that enables the second shift fork 492 to displace the second slider 452 can be exerted on the second slider 452 at a position near the driven shaft 43. Accordingly, the posture of the second slider 452 in the displacement of the second slider 452 can be easily stabilized. Thus, not only occurrence of dog clunking noise but also a sensation of incongruity experienced by a driver due to variations of dog clunking noise can be reduced.

In addition, by reducing the radius of the second slider 452 as described above, the peripheral speed of the second slider 452 that rotates together with the driven shaft 43 in the second fork receiving groove 452a can be reduced. In this manner, a force exerted on a portion at which the second shift fork 492 contacts the inner surface of the second fork receiving groove 452a can be reduced. As a result, abrasion of the second shift fork 492 can also be reduced.

By relatively reducing the radius of the third slider 453, a force that enables the third shift fork 493 to displace the third slider 453 can be exerted on the third slider 453 at a position near the driven shaft 43. Accordingly, the posture of the third slider 453 in the displacement of the third slider 453 can be easily stabilized. Thus, not only occurrence of dog clunking noise but also a sensation of incongruity experienced by a driver due to variations of dog clunking noise can be reduced.

In addition, by reducing the radius of the third slider 453 as described above, the peripheral speed of the third slider 453 that rotates together with the driven shaft 43 in the third fork receiving groove 453a can be reduced. In this manner, a force exerted on a portion at which the third shift fork 493 contacts the inner surface of the third fork receiving groove 453a can be reduced. In this manner, abrasion of the third shift fork 493 can also be reduced.

Through further investigation, the inventor found that an increase in the number of the fifth-speed dog projections 465 of the first slider 451 and the fifth-speed dog recesses 475 of the fifth-speed driving gear 425 to some degree leads to dispersion of a stress generated when the fifth-speed dog projections 465 the fifth-speed dog recesses 475 mesh with each other. The inventor found that the dispersion of the stress generated when the fifth-speed dog projections 465 and the fifth-speed dog recesses 475 mesh with each other as described above can further reduce dog clunking noise.

Since the fifth-speed driving gear 425 that contacts the fifth-speed dog projections 465 of the first slider 451 can rotate relative to the driving shaft 41, the fifth-speed driving gear 425 can tilt relative to the driving shaft 41 in some cases. The inventor found that, in particular, since the fifth-speed driving gear 425 meshes with the fifth-speed driven gear 445 that cannot rotate relative to the driven shaft 43, the fifth-speed driving gear 425 tilts greatly at this meshing point. The inventor then found that even when the fifth-speed driving gear 425 tilts as described above, an increase in the number of the fifth-speed dog projections 465 and the fifth-speed dog recesses 475 to some degree leads to dispersion of a stress generated when the fifth-speed dog projections 465 and the fifth-speed dog recesses 475 mesh with each other.

The inventor also found that an increase in the number of the fifth-speed dog projections 465 and the fifth-speed dog recesses 475 to some degree can stabilize the posture of the fifth-speed driving gear 425, and thus, variations of dog clunking noise can be reduced.

Figure 8A:
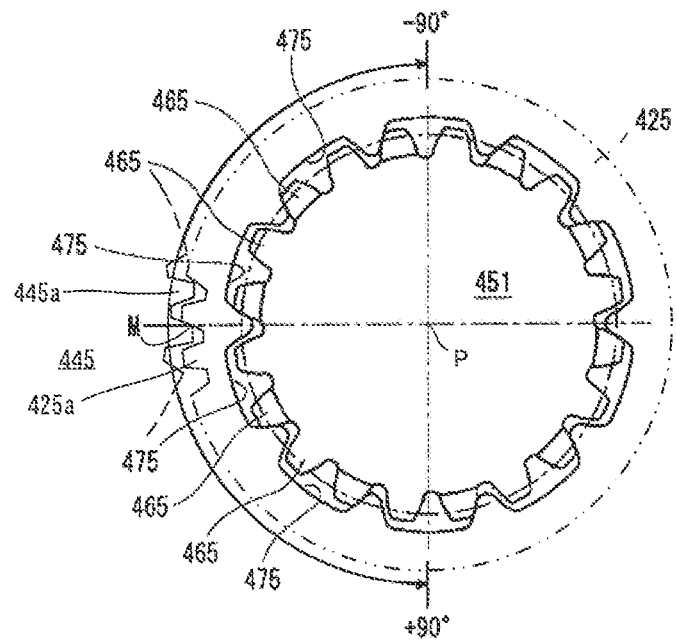
FIG. 8A is a view schematically illustrating a state in which dog projections of the slider mesh with dog recesses of the driving gear in the transmission.

FIG. 8A is an enlarged view of FIG. 2B. That is, FIG. 8A is a view schematically illustrating a state in which a part of the fifth-speed driving gear 425 meshes with the first slider 451. In FIG. 8A, reference numeral 425*a* denotes teeth of the fifth-speed driving gear 425, and reference numeral 445*a* denotes teeth of the fifth-speed driven gear 445. FIG. 8A shows only a part of the teeth of the fifth-speed driving gear 425 and the fifth-speed driven gear 445, and in the other part, the outermost periphery of the gear is shown as a part of a circle indicated by a chain double-dashed line.

As illustrated in FIG. 8A, a plurality of (four in the illustrated example) fifth-speed dog projections 465 and a plurality of (four in the illustrated example) fifth-speed dog recesses 475 mesh with each other within a range of +90 degrees (90 degrees at one side in the circumferential direction) and −90 degrees (90 degrees at another side in the circumferential direction) in the circumferential direction of the fifth-speed driving gear 425 with respect to a line connecting a meshing point M between the fifth-speed driving gear 425 and the fifth-speed driven gear 445 and a shaft center P of the driving shaft 41. In this manner, advantages described above can be obtained.

In particular, the configuration in which the numbers of the fifth-speed dog projections 465 and the fifth-speed dog recesses 475 that mesh with each other are set at four or more within the range described above enables efficient dispersion of a stress generated when the projections and the recesses mesh with each other. In addition, the configuration in which the numbers of the fifth-speed dog projections 465 and the fifth-speed dog recesses 475 that mesh with each other are set at four or more can stabilize the posture of the fifth-speed driving gear 425. As a result, variations of dog clunking noise can be reduced.

The one side or the other side in the circumferential direction coincides with the rotation direction of the fifth-speed driving gear 425.

By increasing the number of the sixth-speed dog projections 466 of the first slider 451 and the number of the sixth-speed dog recesses 476 of the sixth-speed driving gear 426 to some degree, a stress generated when the sixth-speed dog projections 466 and the sixth-speed dog recesses 476 mesh with each other can be dispersed. Thus, dog clunking noise can be further reduced. By increasing the number of the sixth-speed dog projections 466 and the number of the sixth-speed dog recesses 476 to some degree, the posture of the sixth-speed driving gear 426 can be stabilized. As a result, variations of dog clunking noise can be reduced.

Although not shown because of a configuration similar to the configuration illustrated in FIG. 8A, a plurality of (four in the illustrated example) sixth-speed dog projections 466 and a plurality of (four in the illustrated example) sixth-speed dog recesses 476 mesh with each other within a range of +90 degrees (90 degrees at one side in the circumferential direction) and −90 degrees (90 degrees at another side in the circumferential direction) in the circumferential direction of the sixth-speed driving gear 426 with respect to a line connecting a meshing point between the sixth-speed driving gear 426 and the sixth-speed driven gear 446 and the shaft center of the driving shaft 41. In this manner, advantages described above can be obtained.

In particular, the configuration in which the numbers of the sixth-speed dog projections 466 and the number of the sixth-speed dog recesses 476 that mesh with each other are set at four or more within the range described above enables efficient dispersion of a stress generated when the projections and the recesses mesh with each other. In addition, the configuration in which the numbers of the sixth-speed dog projections 466 and the sixth-speed dog recesses 476 that mesh with each other are set at four or more can stabilize the posture of the sixth-speed driving gear 426. As a result, variations of dog clunking noise can be reduced.

The one side or the other side in the circumferential direction coincides with the rotation direction of the sixth-speed driving gear 426.

By increasing the number of the first-speed dog projections 461 of the second slider 452 and the number of the first-speed dog recesses 471 of the first-speed driven gear 441 to some degree, a stress generated when the first-speed dog projections 461 and the first-speed dog recesses 471 mesh with each other can be dispersed. Thus, dog clunking noise can be further reduced. By increasing the number of the first-speed dog projections 461 and the number of the first-speed dog recesses 471 to some degree, the posture of the first-speed driven gear 441 can be stabilized. As a result, variations of dog clunking noise can be reduced.

Although not shown because of a configuration similar to the configuration illustrated in FIG. 8A, a plurality of (four in the illustrated example) first-speed dog projections 461 and a plurality of (four in the illustrated example) first-speed dog recesses 471 mesh with each other within a range of +90 degrees (90 degrees at one side in the circumferential direction) and −90 degrees (90 degrees at another side in the circumferential direction) in the circumferential direction of the first-speed driven gear 441 with respect to a line connecting a meshing point between the first-speed driving gear 421 and the first-speed driven gear 441 and a shaft center of the driven shaft 43. In the foregoing manner, advantages described above can be obtained.

In particular, the configuration in which the numbers of the first-speed dog projections 461 and the number of the first-speed dog recesses 471 that mesh with each other are set at four or more within the range described above enables efficient dispersion of a stress generated when the projections and the recesses mesh with each other. In addition, the configuration in which the numbers of the first-speed dog projections 461 and the first-speed dog recesses 471 that mesh with each other are set at four or more can stabilize the posture of the first-speed driven gear 441. As a result, variations of dog clunking noise can be reduced.

The one side or the other side in the circumferential direction coincides with the rotation direction of the first-speed driven gear 441.

By increasing the number of the third-speed dog projections 463 of the second slider 452 and the number of the third-speed dog recesses 473 of the third-speed driven gear 443 to some degree, a stress generated when the third-speed dog projections 463 and the third-speed dog recesses 473 mesh with each other can be dispersed. Thus, dog clunking noise can be further reduced. By increasing the number of the third-speed dog projections 463 and the number of the third-speed dog recesses 473 to some degree, the posture of the third-speed driven gear 443 can be stabilized. As a result, variations of dog clunking noise can be reduced.

Although not shown because of a configuration similar to the configuration illustrated in FIG. 8A, a plurality of (four in the illustrated example) third-speed dog projections 463 and a plurality of (four in the illustrated example) third-speed dog recesses 473 mesh with each other within a range of +90 degrees (90 degrees at one side in the circumferential direction) and −90 degrees (90 degrees at another side in the circumferential direction) in the circumferential direction of the third-speed driven gear 443 with respect to a line connecting a meshing point between the third-speed driving gear 423 and the third-speed driven gear 443 a and the shaft center of the driven shaft 43. In this manner, advantages described above can be obtained.

In particular, the configuration in which the numbers of the third-speed dog projections 463 and the number of the third-speed dog recesses 473 that mesh with each other are set at four or more enables efficient dispersion of a stress generated when the projections and the recesses mesh with each other. In addition, the configuration in which the numbers of the third-speed dog projections 463 and the third-speed dog recesses 473 that mesh with each other are set at four or more can stabilize the posture of the third-speed driven gear 443. As a result, variations of dog clunking noise can be reduced.

The one side or the other side in the circumferential direction coincides with the rotation direction of the third-speed driven gear 443.

By increasing the number of the second-speed dog projections 462 of the third slider 453 and the number of the second-speed dog recesses 472 of the second-speed driven gear 442 to some degree, a stress generated when the second-speed dog projections 462 and the second-speed dog recesses 472 mesh with each other can be dispersed. Thus, dog clunking noise can be further reduced. By increasing the number of the second-speed dog projections 462 and the number of the second-speed dog recesses 472 to some degree, the posture of the second-speed driven gear 442 can be stabilized. As a result, variations of dog clunking noise can be reduced.

Although not shown because of a configuration similar to the configuration illustrated in FIG. 8A, a plurality of (four in the illustrated example) second-speed dog projections 462 and a plurality of (four in the illustrated example) second-speed dog recesses 472 mesh with each other within a range of +90 degrees (90 degrees at one side in the circumferential direction) and −90 degrees (90 degrees at another side in the circumferential direction) in the circumferential direction of the second-speed driven gear 442 with respect to a line connecting a meshing point between the second-speed driving gear 422 and the second-speed driven gear 442 a and the shaft center of the driven shaft 43. In this manner, advantages described above can be obtained.

In particular, the configuration in which the numbers of the second-speed dog projections 462 and the number of the second-speed dog recesses 472 that mesh with each other are set at four or more enables efficient dispersion of a stress generated when the projections and the recesses mesh with each other. In addition, the configuration in which the numbers of the second-speed dog projections 462 and the second-speed dog recesses 472 that mesh with each other are set at four or more can stabilize the posture of the second-speed driven gear 442. As a result, variations of dog clunking noise can be reduced.

The one side or the other side in the circumferential direction coincides with the rotation direction of the second-speed driven gear 442.

By increasing the number of the fourth-speed dog projections 464 of the third slider 453 and the number of the fourth-speed dog recesses 474 of the fourth-speed driven gear 444 to some degree, a stress generated when the fourth-speed dog projections 464 and the fourth-speed dog recesses 474 mesh with each other can be dispersed. Thus, dog clunking noise can be further reduced. By increasing the number of the fourth-speed dog projections 464 and the number of the fourth-speed dog recesses 474 to some degree, the posture of the fourth-speed driven gear 444 can be stabilized. As a result, variations of dog clunking noise can be reduced.

Although not shown because of a configuration similar to the configuration illustrated in FIG. 8A, a plurality of (four in the illustrated example) fourth-speed dog projections 464 and a plurality of (four in the illustrated example) fourth-speed dog recesses 474 mesh with each other within a range of +90 degrees (90 degrees at one side in the circumferential direction) and −90 degrees (90 degrees at another side in the circumferential direction) in the circumferential direction of the fourth-speed driven gear 444 with respect to a line connecting a meshing point between the fourth-speed driving gear 424 and the fourth-speed driven gear 444 and the shaft center of the driven shaft 43. In this manner, advantages described above can be obtained.

In particular, the configuration in which the numbers of the fourth-speed dog projections 464 and the number of the fourth-speed dog recesses 474 that mesh with each other are set at four or more within the range described above enables efficient dispersion of a stress generated when the projections and the recesses mesh with each other. In addition, the configuration in which the numbers of the fourth-speed dog projections 464 and the fourth-speed dog recesses 474 that mesh with each other are set at four or more can stabilize the posture of the fourth-speed driven gear 444. As a result, variations of dog clunking noise can be reduced.

The one side or the other side in the circumferential direction coincides with the rotation direction of the fourth-speed driven gear 444.

As a result, the configuration according to this embodiment can reduce a sensation of incongruity experienced by a driver due to dog clunking noise while reducing dog clunking noise.

As already described with reference to FIG. 6, the plurality of fifth-speed dog projections 465 include the fifth-speed dog projections 465a (an example of dog projections included in a first group) and the fifth-speed dog projections 465b (an example of dog projections included in a second group). The length of the fifth-speed dog projections 465a along the axial direction of the driving shaft 41 is larger than the length of the fifth-speed dog projections 465b along the axial direction. Thus, when the plurality of fifth-speed dog projections 465 mesh with the plurality of fifth-speed dog recesses 475, one of the fifth-speed dog projections 465a (an example of a preceding entry part) first enters one of the plurality of fifth-speed dog recesses 475.

Figure 8B:
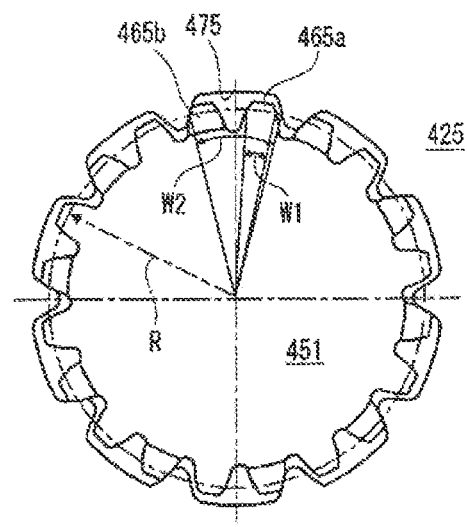
FIG. 8B is a view illustrating a relationship of the width of dog projections in the circumferential direction of the slider in the transmission.

As illustrated in FIG. 8B, a width W1 of each fifth-speed dog projection 465a in the circumferential direction of the fifth-speed driving gear 425 is a half or less of a width W2 of each fifth-speed dog recess 475 in the circumferential direction of the fifth-speed driving gear 425.

In this description, the width W1 of each fifth-speed dog projection 465a in the circumferential direction of the fifth-speed driving gear 425 and the width W2 of each fifth-speed dog recess 475 in the circumferential direction refer to dimensions along the circumferential direction at a meshing position at which the plurality of fifth-speed dog projections 465 and the plurality of fifth-speed dog recesses 475 mesh with each other. The meshing position is the position of a radius R from the center of the driving shaft 41, and indicated as a circumference by a chain line in FIG. 8B.

This configuration can increase the probability that the front ends of the fifth-speed dog projections 465 in the axial direction of the driving shaft 41 enter the fifth-speed dog recesses 475 without collision with the side surface of the fifth-speed driving gear 425 facing the fifth-speed dog projections 465 in the axial direction. As a result, dog clunking noise can be further reduced. Accordingly, dog clunking noise can be further reduced, and a sensation of incongruity experienced by the driver due to dog clunking noise can also be reduced.

The plurality of sixth-speed dog projections 466 include sixth-speed dog projections 466a and sixth-speed dog projections 466b. The length of the sixth-speed dog projections 466a along the axial direction of the driving shaft 41 is larger than the length of the sixth-speed dog projections 466b along the axial direction. Thus, when the plurality of sixth-speed dog projections 466 mesh with the plurality of sixth-speed dog recesses 476, one of the sixth-speed dog projections 466a (an example of the preceding entry part) first enters one of the plurality of sixth-speed dog recesses 476.

Although not shown because of a configuration similar to the configuration illustrated in FIG. 8B, a width of each sixth-speed dog projection 466a in the circumferential direction of the sixth-speed driving gear 426 is a half or less of a width of each sixth-speed dog recess 476 in the circumferential direction of the sixth-speed driving gear 426.

In this description, the width of each sixth-speed dog projection 466a in the circumferential direction of the sixth-speed driving gear 426 and the width of each sixth-speed dog recess 476 in the circumferential direction refer to dimensions along the circumferential direction at a meshing position at which the plurality of sixth-speed dog projections 466 and the plurality of sixth-speed dog recesses 476 mesh with each other (corresponding to the position indicated as the circumference by the chain line in FIG. 8B).

This configuration can increase the probability that the front ends of the sixth-speed dog projections 466 in the axial direction of the driving shaft 41 enter the sixth-speed dog recesses 476 without collision with the side surface of the sixth-speed driving gear 426 facing the sixth-speed dog projections 466 in the axial direction. As a result, dog clunking noise can be further reduced. Accordingly, dog clunking noise can be further reduced, and a sensation of incongruity experienced by driver due to dog clunking noise can also be reduced.

In a manner similar to that of the first slider 451, the plurality of first-speed dog projections 461 provided on the second slider 452 include first-speed dog projections 461 that are relatively long along the axial direction of the driven shaft 43 and first-speed dog projections 461 that are relatively short in the axial direction. Thus, when the plurality of first-speed dog projections 461 mesh with the plurality of first-speed dog recesses 471, one of the relatively long first-speed dog projections 461 (an example of the preceding entry part) enters one of the plurality of first-speed dog recesses 471.

Although not shown because of a configuration similar to the configuration illustrated in FIG. 8B, a width of each relatively long first-speed dog projection 461 in the circumferential direction of the first-speed driven gear 441 is a half or less of a width of each first-speed dog recess 471 in the circumferential direction of the first-speed driven gear 441.

In this description, the width of each relatively long first-speed dog projection 461 in the circumferential direction of the first-speed driven gear 441 and the width of each first-speed dog recess 471 in the circumferential direction refer to dimensions along the circumferential direction at a meshing position at which the plurality of first-speed dog projections 461 and the plurality of first-speed dog recesses 471 mesh with each other (corresponding to the position indicated as the circumference by the chain line in FIG. 8B).

This configuration can increase the probability that the front ends of the first-speed dog projections 461 in the axial direction of the driven shaft 43 enter the first-speed dog recesses 471 without collision with the side surface of the first-speed driven gear 441 facing the first-speed dog projections 461 in the axial direction. As a result, dog clunking noise can be further reduced. Accordingly, dog clunking noise can be further reduced, and a sensation of incongruity experienced by the driver due to dog clunking noise can also be reduced.

The plurality of third-speed dog projections 463 provided on the second slider 452 include third-speed dog projections 463 that are relatively long along the axial direction of the driven shaft 43 and third-speed dog projections 463 that are relatively short in the axial direction. Thus, when the plurality of third-speed dog projections 463 mesh with the plurality of third-speed dog recesses 473, one of the relatively long third-speed dog projections 463 (an example of a second preceding entry part) enters one of the plurality of third-speed dog recesses 473.

Although not shown because of a configuration similar to the configuration illustrated in FIG. 8B, a width of each relatively long third-speed dog projection 463 in the circumferential direction of the third-speed driven gear 443 is a half or less of a width of each third-speed dog recess 473 in the circumferential direction of the third-speed driven gear 443.

In this description, the width of each relatively long third-speed dog projection 463 in the circumferential direction of the third-speed driven gear 443 and the width of each third-speed dog recess 473 in the circumferential direction refer to dimensions along the circumferential direction at a meshing position at which the plurality of third-speed dog projections 463 and the plurality of third-speed dog recesses 473 mesh with each other (corresponding to the position indicated as the circumference by the chain line in FIG. 8B).

This configuration can increase the probability that the front ends of the third-speed dog projections 463 in the axial direction of the driven shaft 43 enter the third-speed dog recesses 473 without collision with the side surface of the third-speed driven gear 443 facing the third-speed dog projections 463 in the axial direction. As a result, dog clunking noise can be reduced. Accordingly, dog clunking noise can be further reduced, and a sensation of incongruity experienced by the driver due to dog clunking noise can be reduced.

The plurality of second-speed dog projections 462 provided on the third slider 453 include second-speed dog projections 462 that are relatively long along the axial direction of the driven shaft 43 and second-speed dog projections 462 that are relatively short in the axial direction. Thus, when the plurality of second-speed dog projections 462 mesh with the plurality of first-speed dog recesses 472, one of the relatively long second-speed dog projections 462 (an example of the preceding entry part) first enters one of the plurality of second-speed dog recesses 472.

Although not shown because of a configuration similar to the configuration illustrated in FIG. 8B, a width of each relatively long second-speed dog projection 462 in the circumferential direction of the second-speed driven gear 442 is a half or less of a width of each second-speed dog recess 472 in the circumferential direction of the second-speed driven gear 442.

In this description, the width of each relatively long second-speed dog projection 462 in the circumferential direction of the second-speed driven gear 442 and the width of each second-speed dog recess 472 in the circumferential direction refer to dimensions along the circumferential direction at a meshing position at which the plurality of second-speed dog projections 462 and the plurality of second-speed dog recesses 472 mesh with each other (corresponding to the position indicated as the circumference by the chain line in FIG. 8B).

This configuration can increase the probability that the front ends of the second-speed dog projections 462 in the axial direction of the driven shaft 43 enter the second-speed dog recesses 472 without collision with the side surface of the second-speed driven gear 442 facing the second-speed dog projections 462 in the axial direction. As a result, dog clunking noise can be reduced. Accordingly, dog clunking noise can be further reduced, and a sensation of incongruity experienced by the driver due to dog clunking noise can also be reduced.

The plurality of fourth-speed dog projections 464 provided on the third slider 453 include fourth-speed dog projections 464 that are relatively long along the axial direction of the driven shaft 43 and fourth-speed dog projections 464 that are relatively short in the axial direction. Thus, when the plurality of fourth-speed dog projections 464 mesh with the plurality of fourth-speed dog recesses 474, one of the relatively long fourth-speed dog projections 464 (an example of the second preceding entry part) first enters one of the plurality of fourth-speed dog recesses 474.

Although not shown because of a configuration similar to the configuration illustrated in FIG. 8B, a width of each relatively long fourth-speed dog projection 464 in the circumferential direction of the fourth-speed driven gear 444 is a half or less of a width of each fourth-speed dog recess 474 in the circumferential direction of the fourth-speed driven gear 444.

In this description, the width of each relatively long fourth-speed dog projection 464 in the circumferential direction of the fourth-speed driven gear 444 and the width of each fourth-speed dog recess 474 in the circumferential direction refer to dimensions along the circumferential direction at a meshing position at which the plurality of fourth-speed dog projections 464 and the plurality of fourth-speed dog recesses 474 mesh with each other (corresponding to the position indicated as the circumference by the chain line in FIG. 8B).

This configuration can increase the probability that the front ends of the fourth-speed dog projections 464 in the axial direction of the driven shaft 43 enter the fourth-speed dog recesses 474 without collision with the side surface of the fourth-speed driven gear 444 facing the fourth-speed dog projections 464 in the axial direction. As a result, dog clunking noise can be reduced. Accordingly, dog clunking noise can be further reduced, and a sensation of incongruity experienced by the driver due to dog clunking noise can also be reduced.

In the transmission 4 according to this embodiment, as illustrated in FIG. 6, the pair of the fifth-speed driving gear 425 and the fifth-speed driven gear 445 and the pair of the sixth-speed driving gear 426 and the sixth-speed driven gear 446 are pairs of helical gears.

Helical gears can have their gear thicknesses (the widths of gears along the axial direction) smaller than those of spur gears. Thus, the thickness of the pair of the fifth-speed driving gear 425 and the fifth-speed driven gear 445 and the thickness of the pair of the sixth-speed driving gear 426 and the sixth-speed driven gear 446 that individually mesh with the first slider 451 can be reduced. Accordingly, the moment of inertia of the fifth-speed and sixth-speed gear groups can be further reduced. As a result, dog clunking noise can be further reduced.

Although not shown because of a configuration similar to those of the pair of the fifth-speed driving gear 425 and the fifth-speed driven gear 445, the pair of the first-speed driving gear 421 and the first-speed driven gear 441 and the pair of the third-speed driving gear 423 and the third-speed driven gear 443 are pairs of helical gears.

In this case, the thickness of the pair of the first-speed driving gear 421 and the first-speed driven gear 441 and the thickness of the pair of the third-speed driving gear 423 and the third-speed driven gear 443 that individually mesh with the second slider 452 can be reduced. Accordingly, the moment of inertia of the first-speed and third-speed gear groups can be further reduced. As a result, dog clunking noise can be further reduced.

The pair of the second-speed driving gear 422 and the second-speed driven gear 442 and the pair of the fourth-speed driving gear 424 and the fourth-speed driven gear 444 are pairs of helical gears.

In this case, the thickness of the pair of the second-speed driving gear 422 and the second-speed driven gear 442 and the thickness of the pair of the fourth-speed driving gear 424 and the fourth-speed driven gear 444 that individually mesh with the third slider 453 can be reduced. Thus, the moment of inertia of the second-speed gear group and the fourth-speed gear group can be further reduced. As a result, dog clunking noise can be further reduced.

In this embodiment, as clearly shown in FIGS. 5A and 6, the fifth-speed dog projections 465 and the sixth-speed dog projections 466 are provided on the first slider 451.

With this configuration, in the direction orthogonal to the axial direction (radial direction of the fifth-speed driving gear 425 and the sixth-speed driving gear 426), a dimension of the first slider 451 can be reduced, as compared to a configuration in which the fifth-speed dog recesses 475 and the sixth-speed dog recesses 476 are provided on the first slider 451. Accordingly, the mass and the radius of the first slider 451 can be further reduced. Thus, the moment of inertia of the first slider 451 can be reduced. As a result, dog clunking noise can be further reduced.

Although not shown because of a configuration similar to that of the first slider 451, the first-speed dog projections 461 and the third-speed dog projections 463 are provided on the second slider 452.

With this configuration, as compared to a configuration in which the first-speed dog recesses 471 and the third-speed dog recesses 473 are provided on the second slider 452, a dimension of the second slider 452 in the direction orthogonal to the axial direction (radial direction of the first-speed driven gear 441 and the third-speed driven gear 443) can be reduced. Accordingly, the mass and the radius of the second slider 452 can be further reduced. Thus, the moment of inertia of the second slider 452 can be reduced. As a result, dog clunking noise can be further reduced.

The second-speed dog projections 462 and the fourth-speed dog projections 464 are provided on the third slider 453.

With this configuration, as compared to a configuration in which the second-speed dog recesses 472 and the fourth-speed dog recesses 474 are provided on the third slider 453, a dimension of the third slider 453 along the direction orthogonal of the axial direction (radial direction of the second-speed driven gear 442 and the fourth-speed driven gear 444) can be reduced. Accordingly, the mass and the radius of the third slider 453 can be further reduced. Thus, the moment of inertia of the third slider 453 can be reduced. As a result, dog clunking noise can be further reduced.

As described above, the vehicle 1 according to this embodiment includes the switch 7 and the electric actuator 9. The switch 7 is operated by a driver. The electric actuator 9 rotates the shift drum 48 of the transmission 40 in accordance with an operation of the switch 7 by the driver.

With this configuration, the rotation angle and the rotation timing of the shift drum 48 can be more accurately controlled by using the electric actuator 9. In the case of the first slider 451, when the fifth-speed dog projections 465 and the fifth-speed dog recesses 475 mesh with each other, rotation phases of these projections and recesses can be easily synchronized, and when the sixth-speed dog projections 466 and the sixth-speed dog recesses 476 mesh with each other, rotation phases of these projections and recesses can be easily synchronized. Thus, dog clunking noise can be further reduced. As a result, a sensation of incongruity experienced by the driver due to dog clunking noise can be further reduced.

The embodiment described above is merely an example for facilitating understanding of the invention. The configuration according to the embodiment can be changed or improved as appropriate without departing from the gist of the invention. It is clear that an equivalent is included in the technical range of the invention.

In the embodiment described above, the number of the plurality of fifth-speed dog projections 465a (an example of dog projections included in the first group) that are relatively long along the axial direction of the driving shaft 41 is equal to the number of the plurality of fifth-speed dog projections 465b (an example of dog projections included in the second group) that are relatively short along the axial direction. In other words, the number of the plurality of fifth-speed dog projections 465a, the number of the plurality of fifth-speed dog projections 465b, and the number of the plurality of fifth-speed dog recesses 475 are the same. Alternatively, the number of the plurality of fifth-speed dog projections 465b may be N times as large as the number of the plurality of fifth-speed dog recesses 475 (where N is an integer of one or more).

In the example illustrated in FIGS. 8A and 8B, one fifth-speed dog projection 465a and one fifth-speed dog projection 465b mesh with each fifth-speed dog recess 475. In a case where the number of the plurality of fifth-speed dog projections 465b is twice as large as the number of the plurality of fifth-speed dog recesses 475 (i.e., N=2), one fifth-speed dog projection 465a and two fifth-speed dog projections 465b enter each fifth-speed dog recess 475. In this example, one fifth-speed dog projection 465a (an example of dog projections included in the first group) and two fifth-speed dog projections 465b (an example of dog projections included in the second group) are alternately arranged along the circumferential direction of the fifth-speed driving gear 425. In this example, when the plurality of fifth-speed dog projections 465 mesh with the plurality of fifth-speed dog recesses 475, the fifth-speed dog projection 465a first enters one of the plurality of fifth-speed dog recesses 475.

In this configuration, the fifth-speed dog projection 465a enters the fifth-speed dog recess 475. Thereafter, depending on the rotation direction of the first slider 451 relative to the fifth-speed driving gear 425, one of two fifth-speed dog projections 465b adjacent to the fifth-speed dog projection 465a in the circumferential direction of the fifth-speed driving gear 425 enters each fifth-speed dog recess 475. In this manner, the fifth-speed dog projections 465 and the fifth-speed dog recesses 475 mesh with each other. The configuration described above can reduce variations of a meshing operation between the plurality of fifth-speed dog projections 465 and the plurality of fifth-speed dog recesses 475 depending on the rotation direction of the first slider 451 relative to the fifth-speed driving gear 425. Accordingly, dog clunking noise can be reduced, and a sensation of incongruity experienced by the driver due to dog clunking noise can also be further reduced.

The variations of a meshing operation herein refer to a variation of the timing at which dog projections and dog recesses mesh each other, a variation in a meshing position, and the like.

In the embodiment described above, the number of the plurality of sixth-speed dog projections 466a (an example of dog projections included in the first group) that are relatively long along the axial direction of the driving shaft 41 is equal to the number of the plurality of sixth-speed dog projections 466b (an example of dog projections included in the second group) that are relatively short along the axial direction. In other words, the number of the plurality of sixth-speed dog projections 466a, the number of the plurality of sixth-speed dog projections 466b, and the number of the plurality of sixth-speed dog recesses 476 are the same. Alternatively, the number of the plurality of sixth-speed dog projections 466b may be N times as large as the number of the plurality of sixth-speed dog recesses 476 (where N is an integer of one or more).

In the embodiment described above, in a manner similar to the example illustrated in FIGS. 8A and 8B, one sixth-speed dog projection 466a and one sixth-speed dog projection 466b mesh with each sixth-speed dog recess 476. In a case where the number of the plurality of sixth-speed dog projections 466b is twice as large as the number of the plurality of sixth-speed dog recesses 476 (i.e., N=2), one sixth-speed dog projection 466a and two sixth-speed dog projections 466b enter each sixth-speed dog recess 476. In this example, one sixth-speed dog projection 466a (an example of dog projections included in the first group) and two sixth-speed dog projections 466b (an example of dog projections included in the second group) are alternately arranged along the circumferential direction of the sixth-speed driving gear 426. In this example, when the plurality of sixth-speed dog projections 466 mesh with the plurality of sixth-speed dog recesses 476, the sixth-speed dog projection 466*a* first enters one of the plurality of sixth-speed dog recesses 476.

In this configuration, the sixth-speed dog projection 466*a* enters the sixth-speed dog recess 476. Thereafter, depending on the rotation direction of the first slider 451 relative to the sixth-speed driving gear 426, one of two sixth-speed dog projections 466*b* adjacent to the sixth-speed dog projection 466*a* in the circumferential direction of the sixth-speed driving gear 426 enters each sixth-speed dog recess 476. In this manner, the sixth-speed dog projections 466 and the sixth-speed dog recesses 476 mesh with each other. The configuration described above can reduce variations of a meshing operation between the plurality of sixth-speed dog projections 466 and the plurality of sixth-speed dog recesses 476 depending on the rotation direction of the first slider 451 relative to the sixth-speed driving gear 426. Accordingly, dog clunking noise can be reduced, and a sensation of incongruity experienced by the driver due to dog clunking noise can also be further reduced.

In the embodiment described above, the number of the plurality of first-speed dog projections 461 (an example of dog projections included in the first group) that are relatively long along the axial direction of the driven shaft 43 is equal to the number of the plurality of first-speed dog projections 461 (an example of dog projections included in the second group) that are relatively short along the axial direction. In other words, the number of the plurality of relatively long first-speed dog projections 461, the number of the plurality of relatively short first-speed dog projections 461, and the number of the plurality of first-speed dog recesses 471 are the same. Alternatively, the number of the plurality of relatively short first-speed dog projections 461 may be N times as large as the number of the plurality of first-speed dog recesses 471 (where N is an integer of one or more).

In the embodiment described above, in a manner similar to the example illustrated in FIGS. 8A and 8B, one relatively long first-speed dog projection 461 and one relatively short first-speed dog projection 461 mesh with each first-speed dog recess 471. In a case where the number of the plurality of relatively short first-speed dog projections 461 is twice as large as the number of the plurality of first-speed dog recesses 471 (i.e., N=2), one relatively long first-speed dog projection 461 and two relatively short first-speed dog projections 461 enter each first-speed dog recess 471. In this example, one relatively long first-speed dog projection 461 (an example of dog projections included in the first group) and two relatively short first-speed dog projections 461 (an example of dog projections included in the second group) are alternately arranged along the circumferential direction of the first-speed driven gear 441. In this example, when the plurality of first-speed dog projections 461 mesh with the plurality of first-speed dog recesses 471, the relatively long first-speed dog projection 461 first enters one of the plurality of first-speed dog recesses 471.

In this configuration, the relatively long first-speed dog projection 461 enters the first-speed dog recess 471. Thereafter, depending on the rotation direction of rotation of the second slider 452 relative to the first-speed driven gear 441, one of two relatively short first-speed dog projections 461 adjacent to the relatively long first-speed dog projection 461 in the circumferential direction of the first-speed driven gear 441 enters each first-speed dog recess 471. In this manner, the first-speed dog projections 461 and the first-speed dog recesses 471 mesh with each other. The configuration described above can reduce variations of a meshing operation between the plurality of first-speed dog projections 461 and the plurality of first-speed dog recesses 471 depending on the rotation direction of the second slider 452 relative to the first-speed driven gear 441. Accordingly, dog clunking noise can be reduced, and a sensation of incongruity experienced by the driver due to dog clunking noise can also be further reduced.

In the embodiment described above, the number of the plurality of third-speed dog projections 463 (an example of dog projections included in the first group) that are relatively long along the axial direction of the driven shaft 43 is equal to the number of the plurality of third-speed dog projections 463 (an example of dog projections included in the second group) that are relatively short along the axial direction. In other words, the number of the plurality of relatively long third-speed dog projections 463, the number of the plurality of relatively short third-speed dog projections 463, and the number of the plurality of third-speed dog recesses 473 are the same. Alternatively, the number of the plurality of relatively short third-speed dog projections 463 may be N times as large as the number of the plurality of third-speed dog recesses 473 (where N is an integer of one or more).

In the embodiment described above, in a manner similar to the example illustrated in FIGS. 8A and 8B, one relatively long third-speed dog projection 463 and one relatively short third-speed dog projection 463 mesh with each third-speed dog recess 473. In a case where the number of the plurality of relatively short third-speed dog projections 463 is twice as large as the number of the plurality of third-speed dog recesses 473 (i.e., N=2), one relatively long third-speed dog projection 463 and two relatively short third-speed dog projections 463 enter each third-speed dog recess 473. In this example, one relatively long third-speed dog projection 463 (an example of dog projections included in the first group) and two relatively short third-speed dog projections 463 (an example of dog projections included in the second group) are alternately arranged along the circumferential direction of the third-speed driving gear 443. In this example, when the plurality of third-speed dog projections 463 mesh with the plurality of third-speed dog recesses 473, the relatively long third-speed dog projection 463 first enters one of the plurality of third-speed dog recesses 473.

In this configuration, the relatively long third-speed dog projection 463 enters the third-speed dog recess 473. Thereafter, depending on the rotation direction of the second slider 452 relative to the third-speed driven gear 443, one of two relatively short third-speed dog projections 463 adjacent to the relatively long third-speed dog projection 463 in the circumferential direction of the third-speed driven gear 443 enters each third-speed dog recess 473. In this manner, the third-speed dog projections 463 and the third-speed dog recesses 473 mesh with each other. The configuration described above can reduce variations of a meshing operation between the plurality of third-speed dog projections 463 and the plurality of third-speed dog recesses 473 depending on the rotation direction of the second slider 452 relative to the third-speed driven gear 443. Accordingly, dog clunking noise can be reduced, and a sensation of incongruity experienced by the driver due to dog clunking noise can also be further reduced.

In the embodiment described above, the number of the plurality of second-speed dog projections 462 (an example of dog projections included in the first group) that are relatively long along the axial direction of the driven shaft 43 is equal to the number of the plurality of second-speed dog projections 462 (an example of dog projections included in the second group) that are relatively short along the axial direction. In other words, the number of the plurality of relatively long second-speed dog projections 462, the number of the plurality of relatively short second-speed dog projections 462, and the number of the plurality of second-speed dog recesses 472 are the same. Alternatively, the number of the plurality of relatively short second-speed dog projections 462 may be N times as large as the number of the plurality of second-speed dog recesses 472 (where N is an integer of one or more).

In the embodiment described above, in a manner similar to the example illustrated in FIGS. 8A and 8B, one relatively long second-speed dog projection 462 and one relatively short second-speed dog projection 462 mesh with each second-speed dog recess 472. In a case where the number of the plurality of relatively short second-speed dog projections 462 is twice as large as the number of the plurality of second-speed dog recesses 472 (i.e., N=2), one relatively long second-speed dog projection 462 and two relatively short second-speed dog projections 462 enter each second-speed dog recess 472. In this example, one relatively long second-speed dog projection 462 (an example of dog projections included in the first group) and two relatively short second-speed dog projections 462 (an example of dog projections included in the second group) are alternately arranged along the circumferential direction of the second-speed driven gear 442. In this example, when the plurality of second-speed dog projections 462 mesh with the plurality of second-speed dog recesses 472, the relatively long second-speed dog projection 462 first enters one of the plurality of second-speed dog recesses 472.

In this configuration, the relatively long second-speed dog projection 462 enters the second-speed dog recess 472. Thereafter, depending on the rotation direction of the third slider 453 relative to the second-speed driven gear 442, one of two relatively short second-speed dog projections 462 adjacent to the relatively long second-speed dog projection 462 in the circumferential direction of the second-speed driven gear 442 enters each second-speed dog recess 472. In this manner, the second-speed dog projections 462 and the second-speed dog recesses 472 mesh with each other. The configuration described above can reduce variations of a meshing operation between the plurality of second-speed dog projections 462 and the plurality of second-speed dog recesses 472 depending on the rotation direction of the third slider 453 relative to the second-speed driven gear 442. Accordingly, dog clunking noise can be reduced, and a sensation of incongruity experienced by the driver due to dog clunking noise can also be further reduced.

In the embodiment described above, the number of the plurality of fourth-speed dog projections 464 (an example of dog projections included in the first group) that are relatively long along the axial direction of the driven shaft 43 is equal to the number of the plurality of fourth-speed dog projections 464 (an example of dog projections included in the second group) that are relatively short along the axial direction. In other words, the number of the plurality of relatively long fourth-speed dog projections 464, the number of the plurality of relatively short fourth-speed dog projections 464, and the number of the plurality of fourth-speed dog recesses 474 are the same. Alternatively, the number of the plurality of relatively short fourth-speed dog projections 464 may be N times as large as the number of the plurality of fourth-speed dog recesses 474 (where N is an integer of one or more).

In the embodiment described above, in a manner similar to the example illustrated in FIGS. 8A and 8B, one relatively long fourth-speed dog projection 464 and one relatively short fourth-speed dog projection 464 mesh with each fourth-speed dog recess 474. In a case where the number of the plurality of relatively short fourth-speed dog projections 464 is twice as large as the number of the plurality of fourth-speed dog recesses 474 (i.e., N=2), one relatively long fourth-speed dog projection 464 and two relatively short fourth-speed dog projections 464 enter each fourth-speed dog recess 474. In this example, one relatively long fourth-speed dog projection 464 (an example of dog projections included in the first group) and two relatively short fourth-speed dog projections 464 (an example of dog projections included in the second group) are alternately arranged along the circumferential direction of the fourth-speed driven gear 444. In this example, when the plurality of fourth-speed dog projections 464 mesh with the plurality of fourth-speed dog recesses 474, the relatively long fourth-speed dog projection 464 first enters one of the plurality of fourth-speed dog recesses 474.

In this configuration, the relatively long fourth-speed dog projection 464 enters the fourth-speed dog recess 474. Thereafter, depending on the rotation direction of the third slider 453 relative to the fourth-speed driven gear 444, one of two relatively short fourth-speed dog projections 464 adjacent to the relatively long fourth-speed dog projection 464 in the circumferential direction of the fourth-speed driven gear 444 enters each fourth-speed dog recess 474. In this manner, the fourth-speed dog projections 464 and the fourth-speed dog recesses 474 mesh with each other. The configuration described above can reduce variations of a meshing operation between the plurality of fourth-speed dog projections 464 and the plurality of fourth-speed dog recesses 474 depending on the rotation direction of the second slider 452 relative to the fourth-speed driven gear 444. Accordingly, dog clunking noise can be reduced, and a sensation of incongruity experienced by the driver due to dog clunking noise can also be further reduced.

As indicated by chain double-dashed lines in FIG. 3, the vehicle 1 may further include a sub-transmission mechanism 11. In this case, the sub-transmission mechanism 11 is related to a transfer direction of power generated by the internal combustion engine 3, and is disposed upstream of the driving shaft 41 or downstream of the driven shaft 43. The sub-transmission mechanism 11 includes, for example, two pairs of driving gears and driven gears having different transmission ratios. The sub-transmission mechanism 11 is a mechanism that substantially doubles the number of gear stages that can be selected in the vehicle 1 in association with the number of gear stages of the transmission 4.

When the number of gear stages increases as described above, frequency of gear-shift operations, that is, frequency of occurrence of dog clunking noise, increases. However, not only dog clunking noise itself but also variations of dog clunking noise can be reduced as described above. Thus, a sensation of incongruity experienced by a driver can still be reduced even when the number of gear stages is increased.

In the embodiment, an operation of the electric actuator 9 for rotating the shift drum 48 is controlled by the switch 7 provided on the handlebar 6. The switch 7 is not necessarily disposed on the handlebar 6. The switch 7 is not necessarily operated by a driver's hand. For example, the switch 7 may be disposed near a foot pedal of the vehicle 1. The switch 7 may be operated by a driver's foot.

An operation of the electric actuator 9 for rotating the shift drum 48 is not necessarily controlled by a driver's operation of the switch 7. The control section 8 may automatically control an operation of the electric actuator 9 in accordance with travelling conditions of the vehicle 1 detected by an unillustrated vehicle-mounted sensor.

With this configuration, a gear-shift operation of the transmission 4 can be automatically carried out without an operation by a driver. The automatic gear-shift operation is, however, often performed at a timing different from a timing intended by the driver. Thus, dog clunking noise tends to be more noticeable to the driver. However, as described above, the configuration of the embodiment can reduce not only dog clunking noise itself but also variations of dog clunking noise. Thus, even in the configuration that performs automatic gear-shift, a sensation of incongruity experienced by the driver can be reduced.

The transmission 4 according to the embodiment described above has a configuration capable of performing six stages of gear-shift. However, the number of stages to which the transmission 4 can be shifted can be determined as appropriate in accordance with specifications of the vehicle 1. The number of pairs of driving gears and driven gears included in the transmission 4 can be determined as appropriate in accordance with the number of necessary stages in combination with whether the vehicle 1 employs the sub-transmission mechanism 11 described above or not.

At this time, whether each driving gear is rotatable on the driving shaft 41 or not is not limited to the example described as the embodiment, and is determined as appropriate depending on specifications of the transmission 4. In a case where a specific driving gear is rotatable on the driving shaft 41, a driven gear meshing with this driving gear is set not to be rotatable on the driven shaft 43. In a case where a specific driving gear is not rotatable on the driving shaft 41, a driven gear meshing with this driving gear is set not to be rotatable on the driven shaft 43.

The slider is disposed adjacent, along the axial direction, to ones of the gears provided on the driving shaft 41 or the driven shaft 43 that are rotatable relative to the driving shaft 41 or the driven shaft 43.

The number of sliders included in the transmission 4 can be determined as appropriate depending on the number of pairs of driving gears and driven gears. At this time, whether each of the sliders is disposed between any one of pairs of adjacent driving gears or driven gears can be determined as appropriate depending on specifications of the transmission 4. The relationship between the number of dog projections and the number of dog recesses described with reference to FIGS. 8A and 8B only needs to be established for the dog projections and the dog recesses on at least one of the sliders of the transmission 4.

At least one of a plurality of pairs of driving gears and driven gears included in the transmission 4 may be a pair of spur gears.

In the embodiment, both the fifth-speed dog projections 465 and the sixth-speed dog projections 466 are provided on the first slider 451. However, at least one of the fifth-speed dog recesses or the sixth-speed dog recesses may be provided on the first slider 451. In a case where the fifth-speed dog recesses are provided on the first slider 451, the fifth-speed dog projections are provided on the fifth-speed driving gear 425. In a case where the sixth-speed dog recesses are provided on the first slider 451, the sixth-speed dog projections are provided on the sixth-speed driving gear 426.

In the embodiment, both the first-speed dog projections 461 and the third-speed dog projections 463 are provided on the second slider 452. However, at least one of the first-speed dog recesses or the third-speed dog recesses may be provided on the second slider 452. In a case where the first-speed dog recesses are provided on the second slider 452, the first-speed dog projections are provided on the first-speed driven gear 441. In a case where the third-speed dog recesses are disposed on the second slider 452, the third-speed dog projections are provided on the third-speed driven gear 443.

In the embodiment, both the second-speed dog projections 462 and the fourth-speed dog projections 464 are provided on the third slider 453. However, at least one of the second-speed dog recesses or the fourth-speed dog recesses may be disposed on the third slider 453. In a case where the second-speed dog recesses are provided on the third slider 453, the second-speed dog projections are provided on the second-speed driven gear 442. In a case where the fourth-speed dog recesses are provided on the third slider 453, the fourth-speed dog projections are provided on the fourth-speed driven gear 444.

In the embodiment, all the first-speed dog projections 461, the second-speed dog projections 462, the third-speed dog projections 463, the fourth-speed dog projections 464, the fifth-speed dog projections 465, and the sixth-speed dog projections 466 have tooth shapes of gears when viewed in the axial direction of the driving shaft 41. However, at least one of the first-speed dog projections 461, the second-speed dog projections 462, the third-speed dog projections 463, the fourth-speed dog projections 464, the fifth-speed dog projections 465, or the sixth-speed dog projections 466 may be arranged in the rotation direction of the driving gears and the driven gears about the driving shaft 41 or the driven shaft 43. At least one of the first-speed dog projections 461, the second-speed dog projections 462, the third-speed dog projections 463, the fourth-speed dog projections 464, the fifth-speed dog projections 465, or the sixth-speed dog projections 466 may be projections extending toward the driving gear or the driven gear that meshes with the dog projections. In this case, the number and shape of at least one of the first-speed dog recesses 471, the second-speed dog recesses 472, the third-speed dog recesses 473, the four-speed dog recesses 474, the fifth-speed dog recesses 475, or the sixth-speed dog recesses 476 may be defined as appropriate so as to mesh with the projections.

Figure 9A:
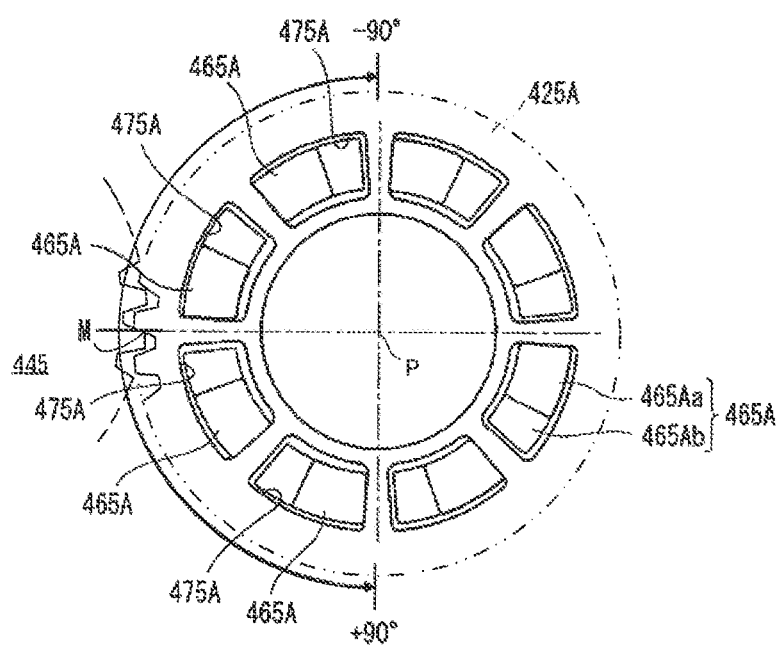
FIG. 9A is a view corresponding to FIG. 8A and illustrating a transmission according to another embodiment.

FIG. 9A is a view schematically illustrating a state in which a first slider 451A and a fifth-speed driving gear 425A having the configuration described above according to the variation mesh with each other, as an example. In a manner similar to that of FIG. 8A, FIG. 9A also shows only a part of teeth of the fifth-speed driving gear 425A and the fifth-speed driven gear 445.

In this example, four fifth-speed dog projections 465A and four fifth-speed dog recesses 475A also mesh with each other within a range of +90 degrees (90 degrees at one side in the circumferential direction) and −90 degrees (90 degrees at another side in the unmeshing direction) in the circumferential direction of the fifth-speed driving gear 425A with respect to a line connecting a meshing point M between the fifth-speed driving gear 425A and the fifth-speed driven gear 445 and a shaft center P of the driving shaft 41.

In the embodiment described above, as illustrated in FIG. 6, front ends of the fifth-speed dog projections 465*a* that are relatively long along the axial direction of the driving shaft 41 and front ends of the fifth-speed dog projections 465*b* that are relatively short along the axial direction are separated from each other in the circumferential direction of the first slider 451. However, the shape of the fifth-speed dog projections 465A is not limited to a shape similar to that in the configuration illustrated in FIG. 6.

Figure 9B:
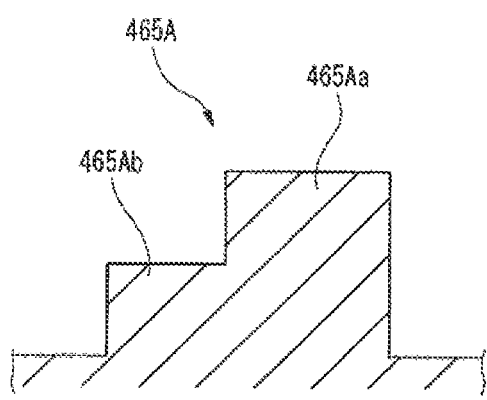
FIG. 9B is a view illustrating an example of a cross-sectional shape of dog projections.

FIG. 9B is a view schematically illustrating a cross-sectional shape of one of the plurality of fifth-speed dog projections 465A illustrated in FIG. 9A along the circumferential direction of the first slider 451A. As illustrated in FIG. 9B, the relatively short fifth-speed dog projections 465Ab and the relatively long fifth-speed dog projections 465Aa may be connected. This configuration is similarly applicable to the first-speed dog projections 461, the second-speed dog projections 462, the third-speed dog projections 463, the fourth-speed dog projections 464, and the sixth-speed dog projections 466.

In this embodiment, meshing between dog projections and dog recesses includes not only a case where all the plurality of dog projections and the plurality of dog recesses mesh with each other but also a case where at least one of the plurality of dog projections meshes with at least one of the plurality of dog recesses.

The vehicle 1 according to the embodiment includes the internal combustion engine 3 as a power source. However, as long as the transmission 4 that performs gear-shift using the shift drum 48 is included, a motor may be used as the power source of the vehicle 1.

The vehicle 1 according to the embodiment is a motorcycle. However, with the transmission 4 that performs transmission using the shift drum 48, the number of front wheels 21 and the number of rear wheels 22 included in the vehicle 1 can be defined as appropriate.

What is claimed is:

1. A transmission that is mounted on a vehicle, the transmission comprising:
    a driving shaft extending in an axial direction and connected to a power source through a clutch mechanism;
    a driven shaft extending in the axial direction;
    a fixed gear integrally rotatably fixed to, in the axial direction, one shaft of the driving shaft or the driven shaft;
    a free rotating gear relatively rotatably fixed to, in the axial direction, another shaft of the driving shaft or the driven shaft and meshing with the fixed gear;
    a slider that is movable in the axial direction and integrally rotatably provided on the other shaft without directly transferring power to a gear disposed on the one shaft;
    a shift drum that has a tubular or columnar shape extending in the axial direction and includes a guide groove extending in a circumferential direction on an outer peripheral surface of the shift drum, the shift drum being configured to be rotatable about a drum shaft extending in the axial direction; and
    a shift fork extending from the shift drum toward the slider, and having one end located in the guide groove of the shift drum and another end connected to the slider, wherein
    one of the slider or the free rotating gear has a plurality of dog projections,
    another one of the slider or the free rotating gear has a plurality of dog recesses that mesh with at least a part of the plurality of dog projections,
    the slider is configured in such a manner that movement of the shift fork in the guide groove in accordance with rotation of the shift drum causes the slider to be movable in the axial direction to a position at which at least one of the plurality of dog projections meshes with at least one of the plurality of dog recesses,
    the free rotating gear rotates integrally with the slider and the other shaft while at least one of the plurality of dog projections meshes with at least one of the plurality of dog recesses because of movement of the slider in the axial direction, and
    each pair of at least four pairs of plurality of dog projections meshes with one of at least four of the plurality of dog recesses within a range of 90 degrees at one side in a circumferential direction of the other shaft and a range of 90 degrees at another side in the circumferential direction of the other shaft with respect to a line connecting a meshing point at which the fixed gear and the free rotating gear mesh with each other and a shaft center of the other shaft when viewed in the axial direction, while movement of the shift fork in the guide groove in accordance with rotation of the shift drum causes the slider to move toward the free rotating gear fixed to the other shaft in the axial direction to thereby cause the at least one of the plurality of dog projections to mesh with the at least one of the plurality of dog recesses.

2. The transmission of claim 1, wherein the plurality of dog projections include a preceding entry part that has a dimension in the circumferential direction less than or equal to a half of a dimension of the plurality of dog recesses in the circumferential direction and that enters at least one of the plurality of dog recesses prior to at least one other part of the plurality of dog projections in a situation where the at least one of the plurality of dog projections meshes with the at least one of the plurality of dog recesses.

3. The transmission of claim 2, wherein the plurality of dog projections have tooth shapes of gears.

4. The transmission of claim 2, further comprising:
    a second fixed gear disposed on the one shaft to be adjacent to the fixed gear along the axial direction, and integrally rotatably fixed to the one shaft in the axial direction; and
    a second free rotating gear disposed on the other shaft to be adjacent to the free rotating gear along the axial direction, relatively rotatably fixed to the other shaft in the axial direction, and configured to mesh with the second fixed gear, wherein
    one of the slider or the second free rotating gear has a plurality of second dog projections,
    another one of the slider or the second free rotating gear has a plurality of second dog recesses,
    the slider is further configured in such a manner that movement of the shift fork in the guide groove in accordance with rotation of the shift drum causes the slider to be movable in the axial direction between the position at which the at least one of the plurality of dog projections meshes with the at least one of the plurality of dog recesses and a position at which at least one of the plurality of second dog projections meshes with at least one of the plurality of second dog recesses,
    the free rotating gear further rotates integrally with the slider and the other shaft while movement of the slider in the axial direction causes the at least one of the plurality of dog projections to mesh with the at least one of the plurality of dog recesses,
    the second free rotating gear rotates integrally with the slider and the other shaft while the at least one of the plurality of second dog projections and the at least one of the plurality of second dog recesses mesh with each other by movement of the slider in the axial direction,
    the at least four of the plurality of dog projections mesh with the at least four of the plurality of dog recesses within the range of 90 degrees at the one side in the circumferential direction of the other shaft and the range of 90 degrees at the other side in the circumferential direction of the other shaft with respect to the line connecting the meshing point at which the fixed gear and the free rotating gear mesh with each other and the shaft center of the other shaft when viewed in the axial direction, while movement of the shift fork in the guide groove in accordance with rotation of the shift drum causes the slider to move toward the free rotating gear fixed to the other shaft in the axial direction to thereby cause the at least one of the plurality of dog projections to mesh with the at least one of the plurality of dog recesses, and at least four of the plurality of second dog projections mesh with at least four of the plurality of second dog recesses within a range of 90 degrees at one side in the circumferential direction of the other shaft and a range of 90 degrees at another side in the circumferential direction of the other shaft with respect to a line connecting a meshing point at which the second fixed gear and the second free rotating gear mesh with each other and the shaft center of the other shaft when viewed in the axial direction, while movement of the shift fork in the guide groove in accordance with rotation of the shift drum causes the slider to move toward the second free rotating gear fixed to the other shaft in the axial direction to thereby cause the at least one of the plurality of second dog projections and the at least one of the plurality of second dog recesses to mesh with each other.

5. The transmission of claim 1, wherein
the plurality of dog projections include dog projections of a first group and dog projections of a second group, a number of the dog projections of the first group is equal to a number of the plurality of dog recesses, the dog projections of the second group are shorter than the dog projections of the first group in the axial direction, a number of the dog projections of the second group is an integral multiple of the number of the plurality of dog recesses,
the dog projections of the second group are arranged in such a manner that at least one of the dog projections of the second group is located between adjacent ones of the dog projections of the first group in the circumferential direction, and
the dog projections of the first group enter at least one of the plurality of dog recesses prior to the dog projections of the second group in a situation where the at least one of the plurality of dog projections meshes with the at least one of the plurality of dog recesses.

6. The transmission of claim 5, wherein the plurality of dog projections have tooth shapes of gears.

7. The transmission of claim 5, further comprising:
a second fixed gear disposed on the one shaft to be adjacent to the fixed gear along the axial direction, and integrally rotatably fixed to the one shaft in the axial direction; and
a second free rotating gear disposed on the other shaft to be adjacent to the free rotating gear along the axial direction, relatively rotatably fixed to the other shaft in the axial direction, and configured to mesh with the second fixed gear, wherein
one of the slider or the second free rotating gear has a plurality of second dog projections,
another one of the slider or the second free rotating gear has a plurality of second dog recesses, the slider is further configured in such a manner that movement of the shift fork in the guide groove in accordance with rotation of the shift drum causes the slider to be movable in the axial direction between the position at which the at least one of the plurality of dog projections meshes with the at least one of the plurality of dog recesses and a position at which at least one of the plurality of second dog projections meshes with at least one of the plurality of second dog recesses, the free rotating gear further rotates integrally with the slider and the other shaft while movement of the slider in the axial direction causes the at least one of the plurality of dog projections to mesh with the at least one of the plurality of dog recesses, the second free rotating gear rotates integrally with the slider and the other shaft while the at least one of the plurality of second dog projections and the at least one of the plurality of second dog recesses mesh with each other by movement of the slider in the axial direction, the at least four of the plurality of dog projections mesh with the at least four of the plurality of dog recesses within the range of 90 degrees at the one side in the circumferential direction of the other shaft and the range of 90 degrees at the other side in the circumferential direction of the other shaft with respect to the line connecting the meshing point at which the fixed gear and the free rotating gear mesh with each other and the shaft center of the other shaft when viewed in the axial direction, while movement of the shift fork in the guide groove in accordance with rotation of the shift drum causes the slider to move toward the free rotating gear fixed to the other shaft in the axial direction to thereby cause the at least one of the plurality of dog projections to mesh with the at least one of the plurality of dog recesses, and at least four of the plurality of second dog projections mesh with at least four of the plurality of second dog recesses within a range of 90 degrees at one side in the circumferential direction of the other shaft and a range of 90 degrees at another side in the circumferential direction of the other shaft with respect to a line connecting a meshing point at which the second fixed gear and the second free rotating gear mesh with each other and the shaft center of the other shaft when viewed in the axial direction, while movement of the shift fork in the guide groove in accordance with rotation of the shift drum causes the slider to move toward the second free rotating gear fixed to the other shaft in the axial direction to thereby cause the at least one of the plurality of second dog projections and the at least one of the plurality of second dog recesses to mesh with each other.

8. The transmission of claim 1, wherein the fixed gear and the free rotating gear are helical gears.

9. The transmission of claim 1, wherein the plurality of dog projections are provided on the slider.

10. The transmission of claim 1, further comprising:
a second fixed gear disposed on the one shaft to be adjacent to the fixed gear along the axial direction, and integrally rotatably fixed to the one shaft in the axial direction; and
a second free rotating gear disposed on the other shaft to be adjacent to the free rotating gear along the axial direction, relatively rotatably fixed to the other shaft in the axial direction, and configured to mesh with the second fixed gear, wherein one of the slider or the second free rotating gear has a plurality of second dog projections, another one of the slider or the second free rotating gear has a plurality of second dog recesses, the slider is further configured in such a manner that movement of the shift fork in the guide groove in accordance with rotation of the shift drum causes the slider to be movable in the axial direction between the position at which the at least one of the plurality of dog projections meshes with the at least one of the plurality of dog recesses and a position at which at least one of the plurality of second dog projections meshes with at least one of the plurality of second dog recesses, the free rotating gear further rotates integrally with the slider and the other shaft while movement of the slider in the axial direction causes the at least one of the plurality of dog projections to mesh with the at least one of the plurality of dog recesses, the second free rotating gear rotates integrally with the slider and the other shaft while the at least one of the plurality of second dog projections and the at least one of the plurality of second dog recesses mesh with each other by movement of the slider in the axial direction, the at least four of the plurality of dog projections mesh with the at least four of the plurality of dog recesses within the range of 90 degrees at the one side in the circumferential direction of the other shaft and the range of 90 degrees at the other side in the circumferential direction of the other shaft with respect to the line connecting the meshing point at which the fixed gear and the free rotating gear mesh with each other and the shaft center of the other shaft when viewed in the axial direction, while movement of the shift fork in the guide groove in accordance with rotation of the shift drum causes the slider to move toward the free rotating gear fixed to the other shaft in the axial direction to thereby cause the at least one of the plurality of dog projections to mesh with the at least one of the plurality of dog recesses, and at least four of the plurality of second dog projections mesh with at least four of the plurality of second dog recesses within a range of 90 degrees at one side in the circumferential direction of the other shaft and a range of 90 degrees at another side in the circumferential direction of the other shaft with respect to a line connecting a meshing point at which the second fixed gear and the second free rotating gear mesh with each other and the shaft center of the other shaft when viewed in the axial direction, while movement of the shift fork in the guide groove in accordance with rotation of the shift drum causes the slider to move toward the second free rotating gear fixed to the other shaft in the axial direction to thereby cause the at least one of the plurality of second dog projections and the at least one of the plurality of second dog recesses to mesh with each other.

11. The transmission of claim 1, further comprising a sub-transmission mechanism disposed upstream of the driving shaft or downstream of the driven shaft in a direction in which power output from the power source is transferred.

12. A vehicle comprising:
   the transmission of claim 1;
   a switch that is operated by a driver; and
   an electric actuator that rotates the shift drum in accordance with an operation of the switch by the driver.

13. A vehicle comprising:
   the transmission of claim 1;
   an electric actuator that rotates the shift drum; and
   a control section that controls an operation of the electric actuator in accordance with a travelling condition of the vehicle.

* * * * *